(12) United States Patent
Han et al.

(10) Patent No.: US 9,191,931 B2
(45) Date of Patent: *Nov. 17, 2015

(54) METHOD AND APPARATUS FOR THE TRANSMISSION OF A CONTROL SIGNAL IN A RADIO COMMUNICATION SYSTEM

(71) Applicant: LG Electronics Inc., Seoul (KR)

(72) Inventors: Seung Hee Han, Anyang-si (KR); Moon Il Lee, Anyang-si (KR); Yeong Hyeon Kwon, Anyang-si (KR); Hyun Soo Ko, Anyang-si (KR); Ja Ho Koo, Anyang-si (KR); Dong Cheol Kim, Anyang-si (KR); Jae Hoon Chung, Anyang-si (KR); Sung Ho Moon, Anyang-si (KR); Jin Sam Kwak, Anyang-si (KR); Min Seok Noh, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,092

(22) Filed: Aug. 20, 2014

(65) Prior Publication Data

US 2014/0362804 A1 Dec. 11, 2014

Related U.S. Application Data

(63) Continuation of application No. 13/058,294, filed as application No. PCT/KR2009/004480 on Aug. 11, 2009, now Pat. No. 8,848,629.

(60) Provisional application No. 61/117,237, filed on Nov. 24, 2008, provisional application No. 61/114,481, filed on Nov. 14, 2008, provisional application No. 61/087,737, filed on Aug. 11, 2008.

(30) Foreign Application Priority Data

Jun. 4, 2009 (KR) .................. 10-2009-0049553

(51) Int. Cl.
*H04W 72/04* (2009.01)
*H04L 25/49* (2006.01)
(Continued)

(52) U.S. Cl.
CPC ......... *H04W 72/0406* (2013.01); *H04L 5/0007* (2013.01); *H04L 5/0053* (2013.01);
(Continued)

(58) Field of Classification Search
None
See application file for complete search history.

(56) References Cited

U.S. PATENT DOCUMENTS

| 6,141,393 A | 10/2000 | Thomas et al. |
| 6,566,948 B1 | 5/2003 | Braithwaite |

(Continued)

FOREIGN PATENT DOCUMENTS

| CN | 1702995 A | 11/2005 |
| CN | 1770658 | 5/2006 |

(Continued)

OTHER PUBLICATIONS

LG Electronics, "Uplink MIMO transmission for LTE-Advanced", 3GPP TSG RAN WG1 Meeting #55, Prague, Czech Republic, Nov. 10-14, 2008, R1-084199.

(Continued)

*Primary Examiner* — Bunjob Jaroenchonwanit
(74) *Attorney, Agent, or Firm* — Dentons US LLP

(57) ABSTRACT

The present invention provides a method and an apparatus for the transmission of control signal in a radio communication system. The method includes the steps of processing first control information on the basis of a first resource index to create a first control signal, processing second control information on the basis of a second resource index to create a second control signal, and transmitting the first control signal and the second control signal.

18 Claims, 22 Drawing Sheets

(51) Int. Cl.
*H04L 27/02* (2006.01)
*H04L 27/18* (2006.01)
*H04L 5/00* (2006.01)
*H04L 27/26* (2006.01)

(52) U.S. Cl.
CPC ............ *H04L25/4906* (2013.01); *H04L 27/02* (2013.01); *H04L 27/18* (2013.01); *H04L 5/0055* (2013.01); *H04L 5/0057* (2013.01); *H04L 27/2602* (2013.01); *H04W 72/04* (2013.01); *H04W 72/042* (2013.01); *H04W 72/0413* (2013.01)

(56) References Cited

U.S. PATENT DOCUMENTS

| | | |
|---|---|---|
| 7,620,096 B2 | 11/2009 | Bar-Ness et al. |
| 7,724,836 B2 | 5/2010 | Hartmann et al. |
| 7,876,739 B2 | 1/2011 | Ahn et al. |
| 7,974,593 B2 | 7/2011 | Cole et al. |
| 7,995,615 B2 | 8/2011 | Yang et al. .............. 370/479 |
| 8,116,277 B2* | 2/2012 | Lee et al. ................ 370/329 |
| 8,238,320 B2 | 8/2012 | Kim et al. |
| 8,249,608 B2* | 8/2012 | Heo et al. ................ 455/450 |
| 8,331,305 B2 | 12/2012 | Wennstrom et al. |
| 8,385,467 B2 | 2/2013 | Han et al. |
| 8,537,763 B2 | 9/2013 | Wang et al. |
| 8,767,646 B2 | 7/2014 | Han et al. |
| 2003/0235147 A1 | 12/2003 | Walton |
| 2005/0047387 A1 | 3/2005 | Frederiksen et al. |
| 2005/0190728 A1 | 9/2005 | Han et al. |
| 2006/0039496 A1 | 2/2006 | Chae et al. |
| 2006/0077886 A1 | 4/2006 | Oh et al. |
| 2006/0093066 A1 | 5/2006 | Jeong et al. |
| 2006/0133530 A1 | 6/2006 | Kwak et al. |
| 2006/0209754 A1 | 9/2006 | Ji et al. |
| 2007/0014272 A1 | 1/2007 | Palanki et al. |
| 2007/0036179 A1 | 2/2007 | Palanki et al. |
| 2007/0183386 A1 | 8/2007 | Muharemovic et al. |
| 2007/0189404 A1 | 8/2007 | Baum et al. |
| 2008/0049692 A1 | 2/2008 | Bachu et al. |
| 2008/0095252 A1 | 4/2008 | Kim et al. |
| 2008/0117833 A1 | 5/2008 | Borran et al. |
| 2008/0153425 A1 | 6/2008 | Heo et al. |
| 2008/0165893 A1 | 7/2008 | Malladi et al. |
| 2008/0186916 A1* | 8/2008 | Oshiba et al. .............. 370/330 |
| 2008/0186918 A1 | 8/2008 | Tinnakornsrisuphap et al. |
| 2008/0198902 A1 | 8/2008 | Malladi |
| 2008/0205348 A1 | 8/2008 | Malladi |
| 2008/0212506 A1* | 9/2008 | Lee et al. ................ 370/310 |
| 2008/0212514 A1* | 9/2008 | Chen ........................ 370/315 |
| 2008/0212555 A1 | 9/2008 | Kim et al. |
| 2008/0225791 A1 | 9/2008 | Pi et al. |
| 2008/0227481 A1 | 9/2008 | Naguib et al. |
| 2008/0232240 A1 | 9/2008 | Baum et al. |
| 2008/0232449 A1 | 9/2008 | Khan et al. |
| 2008/0233966 A1 | 9/2008 | Scheim et al. |
| 2008/0253484 A1 | 10/2008 | Kakura et al. |
| 2008/0273513 A1 | 11/2008 | Montojo et al. |
| 2008/0273516 A1 | 11/2008 | Kim et al. |
| 2008/0318608 A1* | 12/2008 | Inoue et al. .............. 455/509 |
| 2009/0010240 A1 | 1/2009 | Papasakellariou et al. |
| 2009/0028261 A1* | 1/2009 | Zhang et al. ............. 375/261 |
| 2009/0034468 A1 | 2/2009 | Muharemovic et al. |
| 2009/0046645 A1 | 2/2009 | Bertrand et al. |
| 2009/0046694 A1 | 2/2009 | Matsumoto et al. |
| 2009/0060004 A1 | 3/2009 | Papasakellariou et al. |
| 2009/0073955 A1 | 3/2009 | Malladi |
| 2009/0092073 A1 | 4/2009 | Doppler et al. |
| 2009/0092148 A1* | 4/2009 | Zhang et al. ............. 370/458 |
| 2009/0186613 A1* | 7/2009 | Ahn et al. ................ 455/434 |
| 2009/0196240 A1 | 8/2009 | Frederiksen et al. |
| 2009/0196249 A1 | 8/2009 | Kawamura et al. |
| 2009/0239476 A1 | 9/2009 | Womack et al. |
| 2009/0245194 A1* | 10/2009 | Damnjanovic et al. ....... 370/329 |
| 2009/0245212 A1* | 10/2009 | Sambhwani et al. ......... 370/336 |
| 2009/0245284 A1* | 10/2009 | Xu et al. ...................... 370/474 |
| 2009/0268833 A1 | 10/2009 | Ariyavisitakul et al. |
| 2009/0274100 A1 | 11/2009 | Montojo et al. |
| 2009/0276507 A1 | 11/2009 | Ahn et al. |
| 2009/0276675 A1* | 11/2009 | Ojala et al. ................ 714/749 |
| 2009/0280819 A1 | 11/2009 | Brisebois et al. |
| 2009/0285160 A1* | 11/2009 | Cheng et al. ............. 370/328 |
| 2009/0323617 A1* | 12/2009 | Che et al. ................. 370/329 |
| 2009/0323625 A1* | 12/2009 | Lee et al. ................. 370/329 |
| 2010/0022208 A1 | 1/2010 | Cole et al. |
| 2010/0040164 A1 | 2/2010 | Castelain et al. |
| 2010/0046584 A1 | 2/2010 | Palanki et al. |
| 2010/0061361 A1* | 3/2010 | Wu ............................ 370/350 |
| 2010/0091672 A1* | 4/2010 | Ishii .......................... 370/252 |
| 2010/0091724 A1 | 4/2010 | Ishii et al. |
| 2010/0098012 A1 | 4/2010 | Bala et al. ................ 370/329 |
| 2010/0135360 A1 | 6/2010 | Kwak et al. |
| 2010/0150081 A1* | 6/2010 | Gao et al. ................. 370/329 |
| 2010/0150114 A1 | 6/2010 | Che |
| 2010/0150259 A1 | 6/2010 | Castelain et al. |
| 2010/0177741 A1 | 7/2010 | Zhang et al. |
| 2010/0177804 A1 | 7/2010 | Kwak et al. |
| 2010/0179862 A1 | 7/2010 | Chassin et al. |
| 2010/0183104 A1 | 7/2010 | Alexander et al. |
| 2010/0195594 A1* | 8/2010 | Seo et al. ................. 370/329 |
| 2010/0227569 A1 | 9/2010 | Bala et al. ................. 455/73 |
| 2010/0302993 A1 | 12/2010 | Robertson et al. |
| 2010/0329200 A1 | 12/2010 | Chen et al. ................ 370/329 |
| 2010/0329220 A1* | 12/2010 | Kim et al. ................. 370/336 |
| 2011/0009137 A1 | 1/2011 | Chung et al. |
| 2011/0064164 A1* | 3/2011 | Seo et al. ................. 375/316 |
| 2011/0103367 A1 | 5/2011 | Ishii |
| 2011/0134861 A1* | 6/2011 | Seo et al. ................. 370/329 |
| 2011/0158200 A1 | 6/2011 | Bachu et al. |
| 2011/0194524 A1 | 8/2011 | Hedlund et al. |
| 2011/0199997 A1 | 8/2011 | Wennstrom et al. |
| 2011/0205928 A1* | 8/2011 | Pelletier et al. ............. 370/252 |
| 2011/0205996 A1 | 8/2011 | Kim et al. ................ 370/329 |
| 2011/0211522 A1 | 9/2011 | Chung et al. |
| 2011/0261729 A1* | 10/2011 | Ahn et al. ................. 370/280 |
| 2011/0261895 A1 | 10/2011 | Zhang et al. |
| 2011/0268053 A1* | 11/2011 | Che et al. ................. 370/329 |
| 2011/0274079 A1* | 11/2011 | Lee et al. ................. 370/329 |
| 2011/0280203 A1 | 11/2011 | Han et al. |
| 2011/0292900 A1 | 12/2011 | Ahn et al. |
| 2012/0026966 A1 | 2/2012 | Wennstrom et al. |
| 2012/0082113 A1* | 4/2012 | Lee et al. ................. 370/329 |
| 2012/0083302 A1 | 4/2012 | Borran et al. |
| 2012/0099546 A1 | 4/2012 | Cho et al. |
| 2012/0177012 A1* | 7/2012 | Buckley et al. ............. 370/335 |
| 2012/0236773 A1 | 9/2012 | Shen et al. |
| 2012/0236250 A1 | 10/2012 | Yap et al. |
| 2013/0016701 A1* | 1/2013 | Malladi et al. ............ 370/331 |
| 2013/0129013 A1 | 5/2013 | Han et al. |
| 2013/0178221 A1 | 7/2013 | Jung et al. ................ 455/450 |
| 2014/0050190 A1 | 2/2014 | Shimezawa et al. |

FOREIGN PATENT DOCUMENTS

| | | |
|---|---|---|
| CN | 101006658 | 7/2007 |
| CN | 101006659 A | 7/2007 |
| CN | 101027867 | 8/2007 |
| JP | 2004-524727 A | 8/2004 |
| JP | 2007-536830 A | 12/2007 |
| JP | 2009-290615 A | 12/2009 |
| JP | 4511611 B2 | 7/2010 |
| JP | 2010-532130 A | 9/2010 |
| JP | 2010-536226 A | 11/2010 |
| JP | 2011-530941 A | 12/2011 |
| KR | 10-2005-0081552 A | 8/2005 |
| KR | 10-2006-0032765 A | 4/2006 |
| KR | 10-2007-0091889 A | 9/2007 |
| KR | 10-2007-0091889 | 12/2007 |
| KR | 10-2007-0119958 A | 12/2007 |
| KR | 10-2008-0056621 A | 6/2008 |
| KR | 10-2008-0064756 A1 | 7/2008 |
| KR | 10-2008-0065562 A | 7/2008 |
| KR | 10-2008-0073616 A | 8/2008 |

(56) References Cited

FOREIGN PATENT DOCUMENTS

| KR | 10-2008-0096088 A | 10/2008 |
|---|---|---|
| KR | 10-2008-0097360 A | 11/2008 |
| WO | WO 02/47278 A2 | 6/2002 |
| WO | WO 03/021795 A2 | 3/2003 |
| WO | WO 2006/001909 A2 | 1/2006 |
| WO | WO 2006/019253 A1 | 2/2006 |
| WO | 2006/039185 | 4/2006 |
| WO | WO 2007/084988 A2 | 7/2007 |
| WO | WO 2007/119415 | 10/2007 |
| WO | WO 2008/044830 A1 | 4/2008 |
| WO | 2008/086517 A1 | 7/2008 |
| WO | WO 2008/137864 A2 | 11/2008 |
| WO | 2009/002093 A2 | 12/2008 |
| WO | 2009/020358 A1 | 2/2009 |

OTHER PUBLICATIONS

Nortel, "Performance evaluation of multi-antenna SC-FDMA in LTE-A", 3GPP TSG RAN WG1 Meeting #55, Prague, Czech Republic, Nov. 10-14, 2008, R1-084471.
T.G. Noh et al., "Standardization of 3GPP LTE and LTE-Advanced", Electronics and Communication Trend Analysis, vol. 23, No. 3, Jun. 2008.
"Selection of Orthogonal Cover and Cyclic Shift for High Speed UL ACK Channels", R1-073564: 3GPP TSG RAN WG1 Meeting #50; Athens, Greece, Aug. 20-24, 2007.
Papasakellarious et al. "Sequence Hopping in SC-FDMA Communication Systems" Aug. 30, 2007.
Ericsson, "Carrier aggregation in LTE-Advanced", 3GPP TSG-RAN WG1 #53bis, R1-082468, Jul. 2008.
NEC Group, "PUCCH allocation for ACK/NACK transmission", 3GPP TSG RAN WG1 Meeting #50, R1-073462, Aug. 2007.
Motorola, "UL ACK/NACK for TDD", 3GPP TSG RAN1 #52, R1-080738, Feb. 2008.
Nokia Siemens Networks et al., "ACK/NACK Bundling Details for LTE TDD", 3GPP R1-081858, May 9, 2008.
Qualcomm Europe, "UL ACK/NACK assignment procedure", 3GPP R1-083176, Aug. 22, 2008.
InterDigital Communications et al., ACK/NACK Index Mapping for Uplink Transmission for E-UTRA, 3GPP, R1-074701, Nov. 9, 2007.
Huawei, "Physical layer technologies for LTE-Advanced", 3GPP, R1-081838, May 9, 2008.
Motorola, "Uplink ACK/NACK for TDD", 3GPP, R1-081292, Apr. 4, 2008.
Nokia Siemens Networks et al., "Implicit Mapping of ACK/NACK Resources", 3GPP, R1-080939, Feb. 15, 2008.
LG Electronics Inc., "Efficient Utilization of Unused PUCCH RB", 3GPP, R1-081258, Apr. 4, 2008.
Nokia Siemens Networks et al., "PUCCH Resource Allocation for Repeated ACK/NACK", 3GPP, R1-083722, Oct. 3, 2008.
Nortel, UL MIMO Enhancement for LTE-A, 3GPP R1-082516, Jul. 5, 2008.
Mitsubishi Electric, Uplink transmit diversity schemes for LTE Advanced, 3GPP R1-082522, Jul. 4, 2008.
Alcatel, ST/SF Coding and Mapping Schemes of the SC-FDMA in E-UTRA Uplink, 3GPP R1-063178, Nov. 10, 2006.
Qualcomm Europe, Further details on UL ACK/NAK resource allocation, 3GPP R1-081966, May 9, 2008.
Texas Instruments et al., On remaining Issues of PUCCH Slot Based CS/OC Remapping, 3GPP R1-082660, Jul. 4, 2008.
Panasonic et al., Joint Way forward on the ACK/NACK scrambling for PUCCH, 3GPP R1-082731, Jul. 4, 2008.
3GPP TSG RAN WG1 Meeting #54, R1-083094, Jeju, South Korea, Aug. 18-22, 2008, Nokia Siemens Networks, Nokia, PUCCH Resource Allocation for Repeated ACK/NACK.

\* cited by examiner

METHOD AND APPARATUS FOR THE TRANSMISSION OF A CONTROL SIGNAL IN A RADIO COMMUNICATION SYSTEM

This application is a continuation of U.S. patent application Ser. No. 13/058,294 filed on Sep. 9, 2011, which is a 35 USC §371 National Stage entry of International Application No. PCT/KR2009/004480 filed on Aug. 11, 2009, and claims priority to US Provisional Application Nos. 61/087,737 filed on Aug. 11, 2008; 61/114,481 filed on Nov. 14, 2008, 61/117, 237 filed on Nov. 24, 2008 and Korean Patent Application No. 10-2009-0049553 filed on Jun. 4, 2009, all of which are hereby incorporated by reference in their entireties as if fully set forth herein.

BACKGROUND OF THE INVENTION

1. Field of the Invention

The present invention relates to radio communications, and more particularly, to a method and apparatus for transmitting a control signal in a radio communication system.

2. Related Art

In next generation multimedia radio communication systems, which have been actively studied in recent years, there is a demand for a system capable of processing and transmitting a variety of information (e.g., video and radio data) at a higher data rate in addition to the early-stage voice service. The radio communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment (UE), etc. Various techniques have been developed to overcome the abnormal characteristic of the wireless channel and to increase reliability of radio communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc. A MIMO channel matrix depending on the number of receive antennas and the number of transmit antennas can be decomposed into a plurality of independent channels. Each independent channel is referred to as a spatial layer or a stream. The number of streams is referred to as a rank.

There is an ongoing standardization effort for an international mobile telecommunication-advanced (IMT-A) system aiming at the support of an Internal protocol (IP)-based multimedia seamless service by using a high-speed data transfer rate of 1 gigabits per second (Gbps) in a downlink and 500 megabits per second (Mbps) in an uplink in the international telecommunication union (ITU) as a next generation (i.e., post $3^{rd}$ generation) mobile communication system. A $3^{rd}$ generation partnership project (3GPP) is considering a 3GPP long term evolution-advanced (LTE-A) system as a candidate technique for the IMT-A system. It is expected that the LTE-A system is developed to further complete an LTE system while maintaining backward compatibility with the LTE system. This is because the support of compatibility between the LTE-A system and the LTE system facilitates user convenience. In addition, the compatibility between the two systems is also advantageous from the perspective of service providers since the existing equipment can be reused.

A typical radio communication system is a single-carrier system supporting one carrier. Since a data transfer rate is in proportion to a transmission bandwidth, the transmission bandwidth needs to increase to support a high-speed data transfer rate. However, except for some areas of the world, it is difficult to allocate frequencies of wide bandwidths. For the effective use of fragmented small bands, a spectrum aggregation (or bandwidth aggregation or a carrier aggregation) technique is being developed. The spectrum aggregation technique is a technique for obtaining the same effect as when a band of a logically wide bandwidth is used by aggregating a plurality of physically non-contiguous bands in a frequency domain. By using the spectrum aggregation technique, multiple carriers can be supported in the radio communication system. The radio communication system supporting the multiple carriers is referred to as a multiple carrier system. The carrier may also be referred to as other terms, such as, a radio frequency (RF), a component carrier, etc.

Meanwhile, a variety of uplink control information is transmitted through an uplink control channel. Examples of the uplink control information include an acknowledgement (ACK)/not-acknowledgement (NACK) used to perform hybrid automatic repeat request (HARQ), a channel quality indicator (CQI) for indicating a downlink channel state, a scheduling request (SR) for requesting radio resource allocation for uplink transmission, etc.

However, in order to provide a high-speed data rate in a next generation radio communication system, additional control information has to be transmitted, unlike the legacy system. Accordingly, there is a need to provide a method and apparatus for effectively transmitting additional control information while maintaining compatibility with the legacy system.

SUMMARY OF THE INVENTION

The present invention proposes a method and apparatus for transmitting a control signal in a radio communication system.

In an aspect, a method for control signal transmission performed by a user equipment in a radio communication system is provided. The method include generating a first control signal by processing first control information based on a first resource index, generating a second control signal by processing second control information based on a second resource index, and transmitting the first control signal and the second control signal to a base station.

Preferably, the transmitting of the first control signal and the second control signal to the base station may include generating a third control signal by phase-shifting the second control signal, generating a fourth control signal by combining the first control signal and the third control signal, and transmitting the fourth control signal.

Preferably, the first control information may be control information for a first downlink carrier, and the second control information may be control information for a second downlink carrier.

Preferably, the first control information and the second control information may be transmitted on the same uplink carrier.

Preferably, the first control signal and the second control signal may be transmitted concurrently.

Preferably, the first resource index and the second resource index may be different from each other.

Preferably, the first resource index may indicate a first cyclic shift index and a first resource block, and the second resource index may indicate a second cyclic shift index and a second resource block.

Preferably, the generating of the first control signal may include generating a first cyclically shifted sequence by cyclically shifting a base sequence by a first cyclic shift amount obtained from the first cyclic shift index, generating a first modulated sequence based on the first cyclically shifted sequence and a first modulation symbol for the first control information, and generating the first control signal after mapping the first modulated sequence to the first resource block, wherein the generating of the second control signal include generating a second cyclically shifted sequence by cyclically shifting the base sequence by a second cyclic shift amount obtained from the second cyclic shift index, generating a second modulated sequence based on the second cyclically shifted sequence and a second modulation symbol for the second control information, and generating the second control signal after mapping the second modulated sequence to the second resource block.

Preferably, the first control information may be a first acknowledgment (ACK)/non-acknowledgment (NACK) for first data received on a first downlink carrier, and the second control information may be a second ACK/NACK for second data received on a second downlink carrier.

Preferably, the method may further include receiving the first data on the first downlink carrier, and receiving the second data on the second downlink carrier.

In another aspect, an apparatus for radio communication is provided. The apparatus include a radio frequency (RF) unit for generating and transmitting a radio signal, and a processor coupled to the RF unit and configured for generating a first control signal by processing first control information based on a first resource index, generating a second control signal by processing second control information based on a second resource index, and transmitting the first control signal and the second control signal to a base station.

According to the present invention, a method and apparatus for effective control signal transmission in a radio communication system are provided. Therefore, overall system performance can be improved.

DESCRIPTION OF EXEMPLARY EMBODIMENTS

Techniques described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The SC-FDMA is a scheme in which inverse fast Fourier transform (IFFT) is performed on complex-valued symbols subjected to discrete Fourier transform (DFT) spreading, and is also referred to as DFT spreading-orthogonal frequency division multiplexing (DFTS-OFDM). In addition, the techniques described below can also be used in a multiple access scheme modified from the SC-FDMA, for example, clustered SC-FDMA, N×SC-FDMA, etc. The clustered SC-FDMA is a scheme in which complex-valued symbols subjected to DFT spreading are divided into a plurality of sub-blocks and the plurality of sub-blocks are distributed in a frequency domain and are mapped to subcarriers. The clustered SC-FDMA is also referred to as clustered DFTS-OFDM. The N×SC-FDMA is a scheme in which a code block is divided into a plurality of chunks and DFT and IFFT are performed on a chunk basis. The N×SC-FDMA is also referred to as chunk specific DFTS-OFDM.

The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description will focus on the 3GPP LTE/LTE-A. However, technical features of the present invention are not limited thereto.

Figure 1:
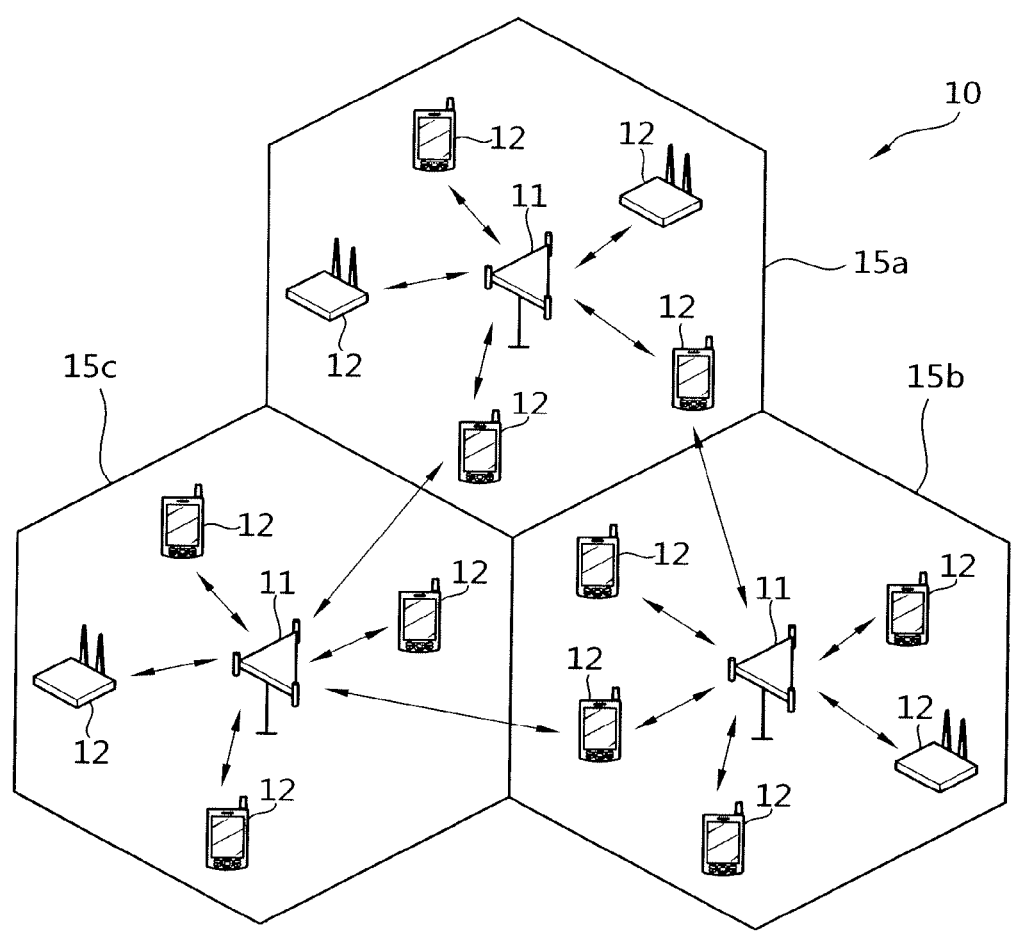
FIG. 1 shows a radio communication system.

FIG. 1 shows a radio communication system.

Referring to FIG. 1, a radio communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

A heterogeneous network implies a network in which a relay station, a femto cell and/or a pico cell, and the like are deployed. In the heterogeneous network, the DL may imply communication from the BS to the relay station, the femto cell, or the pico cell. Further, the DL may also imply communication from the relay station to the UE. Furthermore, in case of multi-hop relay, the DL may imply communication from a first relay station to a second relay station. In the heterogeneous network, the UL may imply communication from the relay station, the femto cell, or the pico cell to the BS. Further, the UL may also imply communication from the UE to the relay station. Furthermore, in case of multi-hop relay, the UL may imply communication from the second relay station to the first relay station.

The radio communication system may be any one of a multiple input multiple output (MIMO) system, a multiple input single output (MISO) system, a single input single output (SISO) system, and a single input multiple output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas.

Hereinafter, the transmit antenna denotes a physical or logical antenna used for transmission of one signal or stream. The receive antenna denotes a physical or logical antenna used for reception of one signal or stream.

UL and/or DL hybrid automatic repeat request (HARQ) can be supported in the radio communication system. In addition, a channel quality indicator (CQI) can be used for link adaptation.

Figure 2:
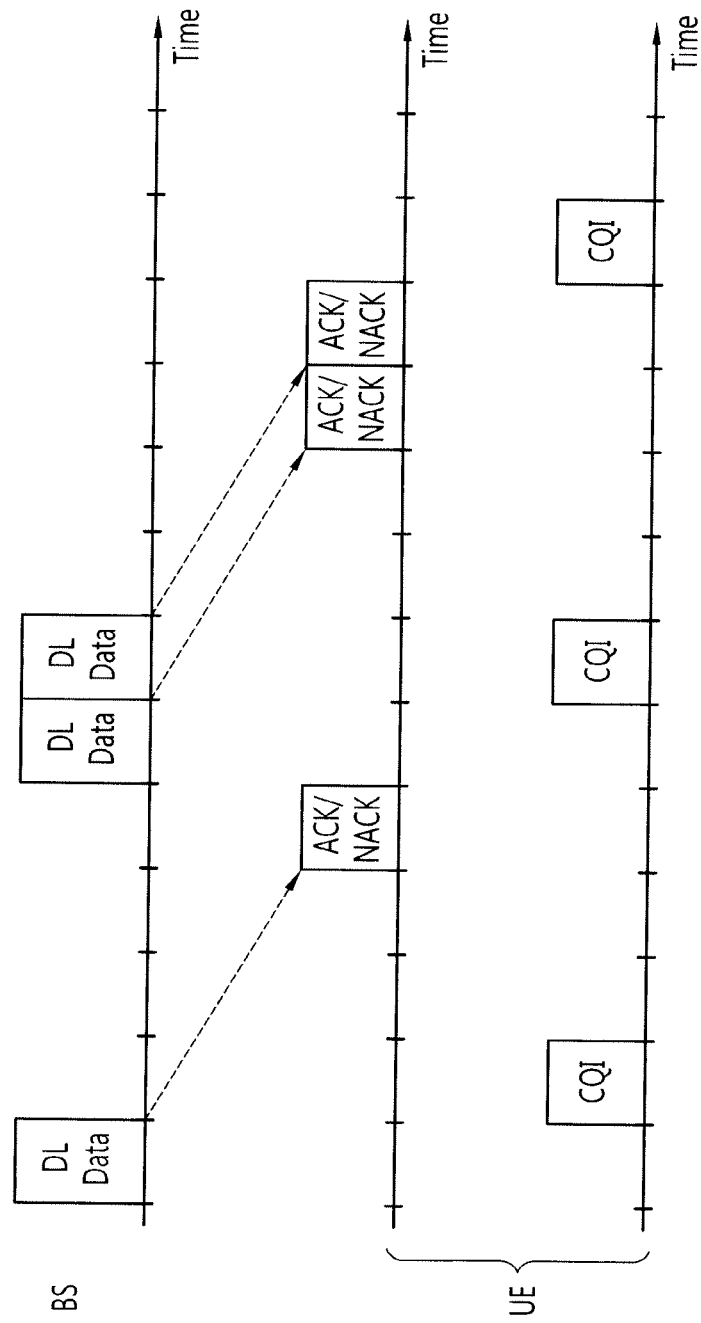
FIG. 2 shows HARQ acknowledgement (ACK)/non-acknowledgement (NACK) and CQI transmission.

FIG. 2 shows HARQ acknowledgement (ACK)/not-acknowledgement (NACK) and CQI transmission.

Referring to FIG. 2, upon receiving DL data from a BS, a UE transmits an HARQ ACK/NACK after a specific time elapses. The DL data may be transmitted on a physical downlink shared channel (PDSCH) indicated by a physical downlink control channel (PDCCH). The HARQ ACK/NACK corresponds to an ACK when the DL data is successfully decoded, and corresponds to an NACK when the DL data fails in decoding. Upon receiving the NACK, the BS can transmit the DL data until the ACK is received or until retransmission is performed up to a maximum number of retransmission attempts.

A transmission time of the HARQ ACK/NACK for the DL data or resource allocation information for HARQ ACK/NACK transmission may be dynamically reported by the BS by using signaling. Alternatively, the transmission time of the HARQ ACK/NACK, the resource allocation information, etc., may be pre-agreed according to the transmission time of the DL data or resource used for transmission of the DL data. For example, when a PDSCH is received on an $n^{th}$ subframe in a frequency division duplex (FDD) system, an HARQ ACK/NACK for the PDSCH may be transmitted on a physical uplink control channel (PUCCH) in an $(n+4)^{th}$ subframe.

The UE may measure a DL channel state and report a CQI to the BS periodically and/or non-periodically. The BS may use the CQI in DL scheduling. The BS may use the CQI received from the UE to determine a modulation and coding scheme (MCS) used in transmission. If it is determined that the channel state is good by using the CQI, the BS may perform transmission by increasing a modulation order or by increasing a coding rate. If it is determined that the channel state is not good by using the CQI, the BS may decrease a data rate by decreasing the modulation order or by decreasing the coding rate. A reception error rate may decrease when the data rate decreases. The CQI may indicate a channel state for a full band and/or a channel state for some parts of the full band. The BS may report information on a transmission time of the CQI or resource allocation information for CQI transmission to the UE.

In addition to the CQI, the UE may report a precoding matrix indicator (PMI), a rank indicator (RI), etc., to the BS. The PMI indicates an index of a precoding matrix selected from a codebook. The RI indicates the number of useful transmission layers. Hereinafter, the CQI is the concept of including not only the CQI but also the PMI and the RI.

Figure 3:
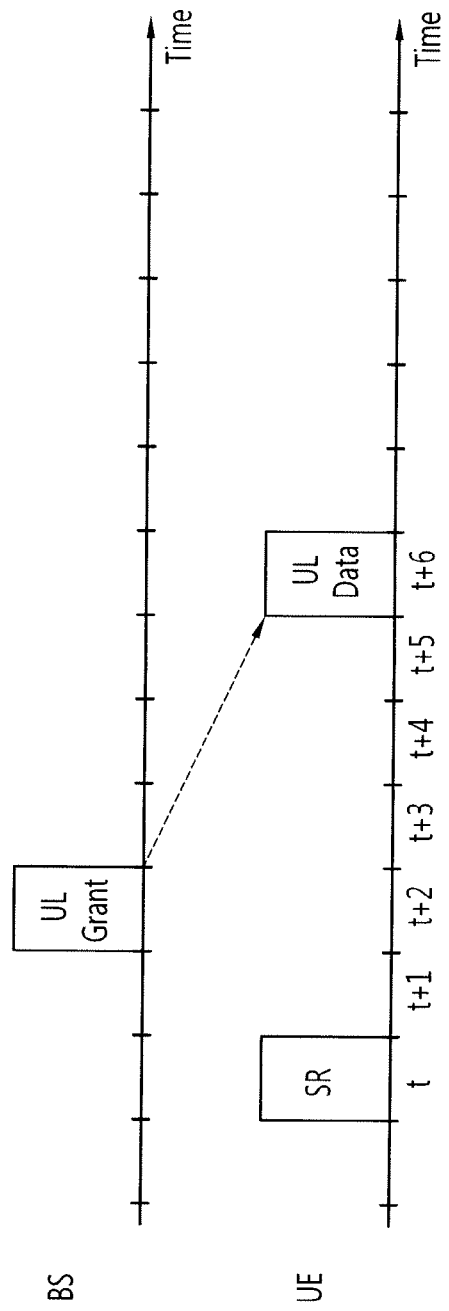
FIG. 3 shows UL transmission.

FIG. 3 shows UL transmission.

Referring to FIG. 3, for UL transmission, a UE first transmits a scheduling request (SR) to a BS. The SR is used when the UE requests the BS to allocate UL radio resources. The SR can also be referred to as a bandwidth request. The SR is a sort of preliminary information exchange for data exchange. In order for the UE to transmit UL data to the BS, the UE firsts requests allocation of the radio resources by using the SR. The BS may report to the UE a transmission time of the SR or resource allocation information for SR transmission. The SR may be periodically transmitted. The BS may report to the UE a transmission period of the SR.

In response to the SR, the BS sends a UL grant to the UE. The UL grant may be transmitted on a PDCCH. The UL grant includes information on UL radio resource allocation. The UE transmits UL data by using the allocated UL radio resource.

As shown in FIG. 2 and FIG. 3, the UE can transmit UL control information (e.g., an HARQ ACK/NACK, a CQI, and an SR) in a given transmission time. A type and size of the UL control information may vary depending on a system, and technical features of the present invention are not limited thereto.

Figure 4:
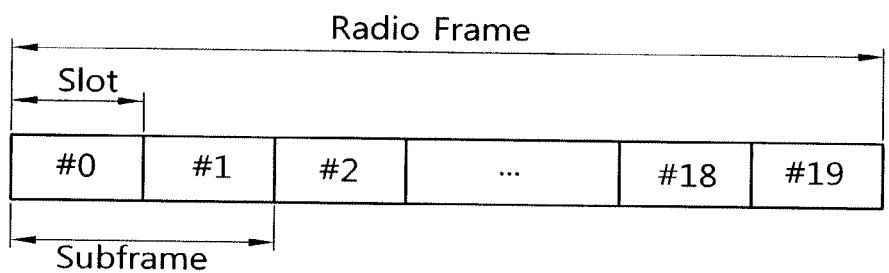
FIG. 4 shows a structure of a radio frame in $3^{rd}$ generation partnership project (3GPP) long term evolution (LTE).

FIG. 4 shows a structure of a radio frame in 3GPP LTE.

Referring to FIG. 4, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 4 is shown for exemplary purposes only. Thus, the number of subframes included in the radio frame or the number of slots included in the subframe may change variously.

Figure 5:
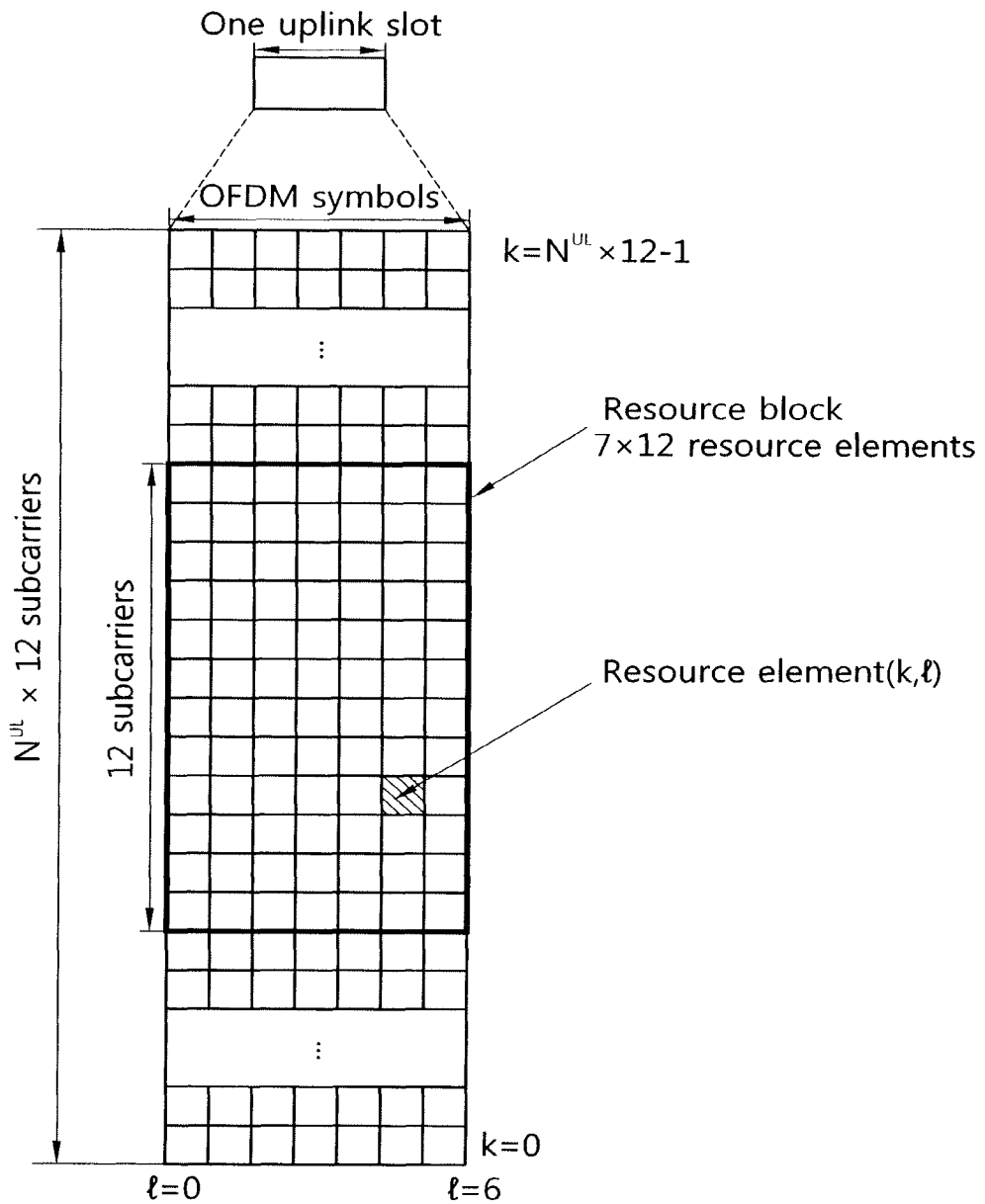
FIG. 5 shows an example of a resource grid for one UL slot in 3GPP LTE.

FIG. 5 shows an example of a resource grid for one UL slot in 3GPP LTE.

Referring to FIG. 5, the UL slot includes a plurality of OFDM symbols in a time domain, and includes $N^{UL}$ resource blocks (RBs) in a frequency domain. The OFDM symbol represents one symbol period. The OFDM symbol can apply to a multiple access scheme such as OFDMA, SC-FDMA, clustered SC-FDMA, N×SC-FDMA, or the like. The OFDM symbol can also be referred to as an SC-FDMA symbol, an OFDMA symbol, or a symbol period according to a system.

The RB includes a plurality of subcarriers in the frequency domain. The number $N^{UL}$ of RBs included in the UL slot depends on a UL transmission bandwidth defined in a cell.

Each element on the resource grid is referred to as a resource element. The resource element on the resource grid can be identified by an index pair (k, l) within the slot. Herein, $k(k=0, \ldots, N^{UL} \times 12-1)$ denotes a subcarrier index in the frequency domain, and $l(l=0, \ldots, 6)$ denotes a symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of subcarriers or the number of OFDM symbols included in the RB may change variously. Hereinafter, the RB implies a typical frequency resource. That is, if the RB differs, the frequency resource also differs. The number of OFDM symbols may change depending on a cyclic prefix (CP) length. For example, when using a normal CP, the number of OFDM symbols is 7, and when using an extended CP, the number of OFDM symbols is 6.

The resource grid for one UL slot in the 3GPP LTE of FIG. 5 can directly apply to a resource grid for a DL slot.

Figure 6:
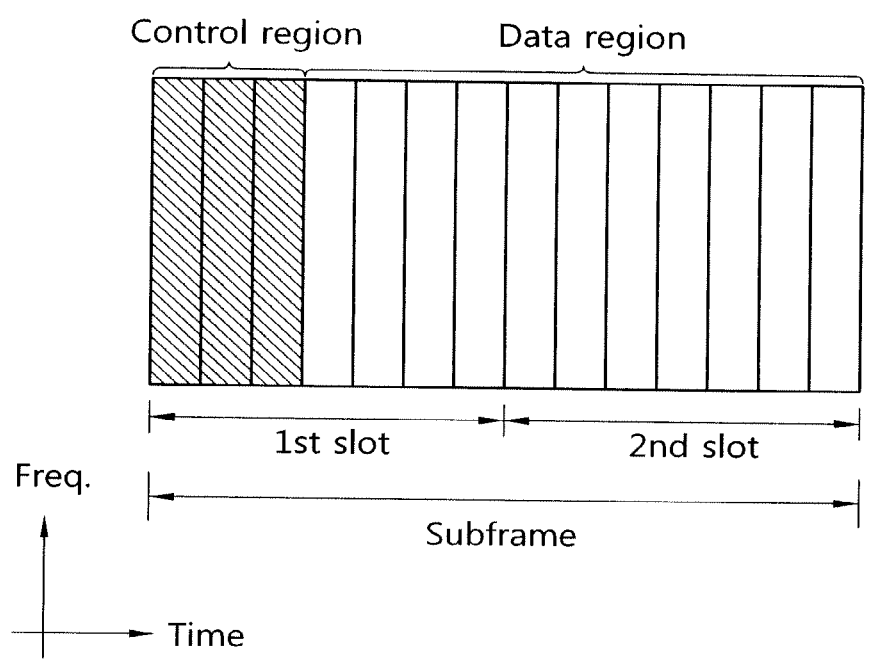
FIG. 6 shows an example of a DL subframe structure in 3GPP LTE.

FIG. 6 shows an example of a DL subframe structure in 3GPP LTE.

Referring to FIG. 6, a DL subframe includes two consecutive slots. Up to three preceding OFDM symbols of a first slot in the DL subframe correspond to a control region. The remaining OFDM symbols correspond to a data region.

A PDSCH may be allocated to the data region. DL data is transmitted on the PDSCH. The DL data may be a transport block, i.e., a data block for a downlink shared channel (DL-SCH) which is a transport channel transmitted during a TTI. A BS may transmit to a UE the DL data through a single antenna or multiple antennas. In the 3GPP LTE, the BS may transmit to the UE one codeword through the single antenna or the multiple antennas, or may transmit two codewords through the multiple antennas. That is, up to two codewords are supported in the 3GPP LTE. The codewords are coded bits obtained by performing channel coding on an information bit corresponding to information. Modulation may be performed on each codeword.

Examples of a control channel that can be allocated to the control region include a physical control format indicator channel (PCFICH), a physical HARQ indicator channel (PHICH), a PDCCH, etc.

The PCFICH carries information indicating the number of OFDM symbols used for transmission of PDCCHs in a subframe. Herein, the control region includes 3 OFDM symbols for exemplary purposes only. The PHICH carries an HARQ ACK/NACK for UL transmission.

The control region consists of a set of a plurality of control channel elements (CCEs). If a total number of CCEs constituting a CCE set is N(CCE) in the DL subframe, the CCEs are indexed from 0 to N(CCE)-1. The CCEs correspond to a plurality of resource elements groups. The resource element group is used to define mapping of the control channel to resource elements. One resource element group consists of a plurality of resource elements. A PDCCH is transmitted on an aggregation of one or several contiguous CCEs. A plurality of PDCCHs may be transmitted in the control region.

The PDCCH carries DL control information such as DL scheduling information, UL scheduling information, or UL power control commands. When the BS transmits DL data on the PDSCH in a subframe to the UE, the BS carries DL control information used for scheduling of the PDSCH on the PDCCH in the subframe. The UE may read the DL data transmitted on the PDSCH by decoding the DL control information.

Figure 7:
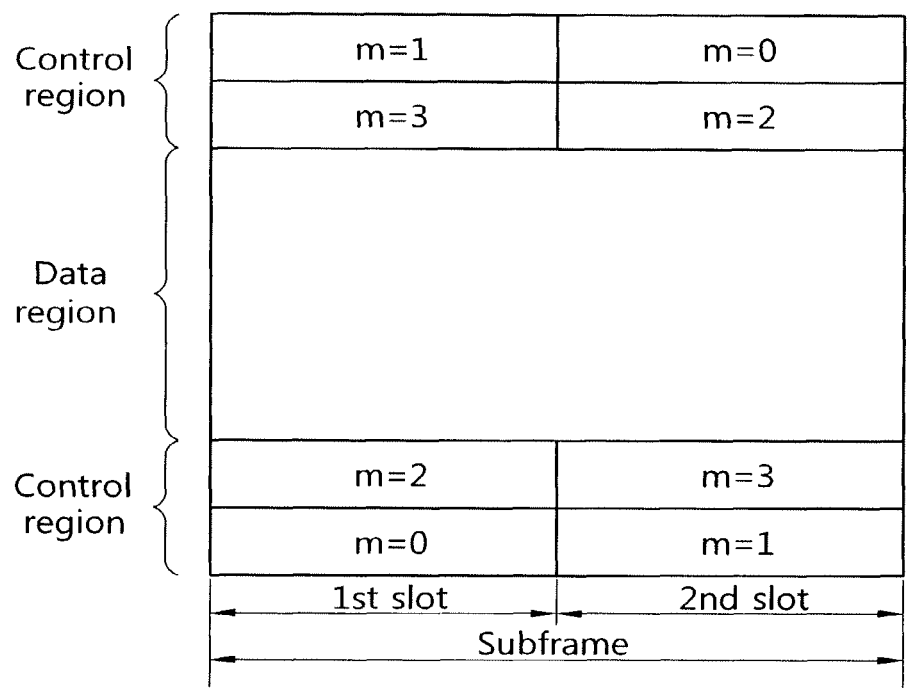
FIG. 7 shows an example of a UL subframe structure in 3GPP LTE.
Figure 7:
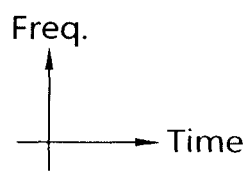

FIG. 7 shows an example of a UL subframe structure in 3GPP LTE.

Referring to FIG. 7, a UL subframe can be divided into a control region to which a PUCCH for carrying UL control information is allocated and a data region to which a physical uplink shared channel (PUSCH) for carrying UL data is allocated. In 3GPP LTE(Release 8), RBs allocated to one UE are contiguous in a frequency domain in order to maintain a single-carrier property. One UE cannot concurrently transmit the PUCCH and the PUSCH. Concurrent transmission of the PUCCH and the PUSCH are taken into account in LTE-A (Release 10).

The PUCCH for one UE is allocated in an RB pair. RBs belonging to the RB pair occupy different subcarriers in each of a first slot and a second slot. A frequency occupied by the RBs belonging to the RB pair allocated to the PUCCH changes at a slot boundary. That is, the RBs allocated to the PUCCH are hopped in a slot level. Hereinafter, hopping of RBs in the slot level is referred to as frequency hopping. Since the UE transmits UL control information over time at a frequency located in a different position, a frequency diversity gain can be obtained. In FIG. 7, m is a location index indicating a logical frequency-domain location of the RB pair allocated to the PUCCH in the subframe.

The PUSCH is mapped to an uplink shared channel (UL-SCH) that is a transport channel. Examples of the UL control information transmitted on the PUCCH include an HARQ ACK/NACK, a CQI indicating a DL channel state, an SR that is a UL radio resource allocation request, etc.

The PUCCH can support multiple formats. That is, UL control information having a different number of bits per subframe can be transmitted according to a modulation scheme depending on an application of the PUCCH format. Table 1 below shows an example of the modulation scheme depending on the PUCCH format and the number of bits per subframe.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to transmit the SR. The PUCCH formats 1a/1b are used to transmit the HARQ ACK/NACK. The PUCCH format 2 is used to transmit the CQI. The PUCCH formats 2a/2b are used to transmit the CQI and the HARQ ACK/NACK.

In any subframe, if the HARQ ACK/NACK is transmitted alone, the PUCCH formats 1a/1b are used, and if the SR is transmitted alone, the PUCCH format 1 is used. The UE can concurrently transmit the HARQ ACK/NACK and the SR. For positive SR transmission, the UE transmits the HARQ ACK/NACK by using a PUCCH resource allocated for the SR. For negative SR transmission, the UE transmits the HARQ ACK/NACK by using a PUCCH resource allocated for the ACK/NACK.

Control information transmitted on the PUCCH uses a cyclically shifted sequence. The cyclically shifted sequence may be generated by cyclically shifting a base sequence by a specific cyclic shift (CS) amount. The specific CS amount is indicated by a CS index. Various types of sequences may be used as the base sequence. For example, well-known sequences (e.g., a pseudo-random (PN) sequence and a Zadoff-Chu (ZC) sequence) may be used as the base sequence. In addition, a computer generated constant amplitude zero autocorrelation (CAZAC) sequence may be used as the base sequence. Equation 1 below shows an example of the base sequence.

$$r_i(n)=e^{jb(n)\pi/4}$$ [Equation 1]

In Equation 1, $i \in \{0, 1, \ldots, 29\}$ denotes a root index, and n denotes an element index satisfying $0 \leq n \leq N-1$, where N is a length of the base sequence. i denotes a cell identifier (ID), and may be determined by a slot number or the like within a radio frame. If one RB includes 12 subcarriers, N may be set to 12. A different root index defines a different base sequence. If N=12, b(n) can be defined by Table 2 below.

TABLE 2

| i | b(0), ..., b(11) | | | | | | | | | | | |
|---|---|---|---|---|---|---|---|---|---|---|---|---|
| 0  | -1 | 1  | 3  | -3 | 3  | 3  | 1  | 1  | 3  | 1  | -3 | 3  |
| 1  | 1  | 1  | 3  | 3  | 3  | -1 | 1  | -3 | -3 | 1  | -3 | 3  |
| 2  | 1  | 1  | -3 | -3 | -3 | -1 | -3 | -3 | 1  | -3 | 1  | -1 |
| 3  | -1 | 1  | 1  | 1  | 1  | -1 | -3 | -3 | 1  | -3 | 3  | -1 |
| 4  | -1 | 3  | 1  | -1 | 1  | -1 | -3 | -1 | 1  | -1 | 1  | 3  |
| 5  | 1  | -3 | 3  | -1 | -1 | 1  | 1  | -1 | -1 | 3  | -3 | 1  |
| 6  | -1 | 3  | -3 | -3 | -3 | 3  | 1  | -1 | 3  | 3  | -3 | 1  |
| 7  | -3 | -1 | -1 | -1 | 1  | -3 | 3  | -1 | 1  | -3 | 3  | 1  |
| 8  | 1  | -3 | 3  | 1  | -1 | -1 | -1 | 1  | 1  | 3  | -1 | 1  |
| 9  | 1  | -3 | -1 | 3  | 3  | -1 | -3 | 1  | 1  | 1  | 1  | 1  |
| 10 | -1 | 3  | -1 | 1  | 1  | -3 | -3 | -1 | -3 | -3 | 3  | -1 |
| 11 | 3  | 1  | -1 | -1 | 3  | 3  | -3 | 1  | 3  | 1  | 3  | 3  |
| 12 | 1  | -3 | 1  | 1  | -3 | 1  | 1  | 1  | -3 | -3 | -3 | 1  |
| 13 | 3  | 3  | -3 | 3  | -3 | 1  | 1  | 3  | -1 | -3 | 3  | 3  |
| 14 | -3 | 1  | -1 | -3 | -1 | 3  | 1  | 3  | 3  | 3  | -1 | 1  |
| 15 | 3  | -1 | 1  | -3 | -1 | -1 | 1  | 1  | 3  | 1  | -1 | -3 |
| 16 | 1  | 3  | 1  | -1 | 1  | 3  | 3  | 3  | -1 | -1 | 3  | -1 |
| 17 | -3 | 1  | 1  | 3  | -3 | 3  | -3 | -3 | 3  | 1  | 3  | -1 |
| 18 | -3 | 3  | 1  | 1  | -3 | 1  | -3 | -3 | -1 | -1 | 1  | -3 |
| 19 | -1 | 3  | 1  | 3  | 1  | -1 | -1 | 3  | -3 | -1 | -3 | -1 |
| 20 | -1 | -3 | 1  | 1  | 1  | 1  | 3  | 1  | -1 | 1  | -3 | -1 |
| 21 | -1 | 3  | -1 | 1  | -3 | -3 | -3 | -3 | -3 | 1  | -1 | -3 |
| 22 | 1  | 1  | -3 | -3 | -3 | -3 | -1 | 3  | -3 | 1  | -3 | 3  |
| 23 | 1  | 1  | -1 | -3 | -1 | -3 | 1  | -1 | 1  | 3  | -1 | 1  |
| 24 | 1  | 1  | 3  | 1  | 3  | 3  | -1 | 1  | -1 | -3 | -3 | 1  |
| 25 | 1  | -3 | 3  | 3  | 1  | 3  | 3  | 1  | -3 | -1 | -1 | 3  |
| 26 | 1  | 3  | -3 | -3 | 3  | -3 | 1  | -1 | -1 | 3  | -1 | -3 |
| 27 | -3 | -1 | -3 | -1 | -3 | 3  | 1  | -1 | 1  | 3  | -3 | -3 |
| 28 | -1 | 3  | -3 | 3  | -1 | 3  | 3  | -3 | 3  | 3  | -1 | -1 |
| 29 | 3  | -3 | -3 | -1 | -1 | -3 | -1 | 3  | -3 | 3  | 1  | -1 |

A cyclically shifted sequence r(n, Ics) may be generated by cyclically shifting a base sequence r(n) according to Equation 2 below.

$$r(n, I_{cs}) = r(n) \cdot \exp\left(\frac{j2\pi I_{cs} n}{N}\right),$$ [Equation 2]
$$0 \leq I_{cs} \leq N - 1$$

In Equation 2, Ics denotes a CS index indicating a CS amount ($0 \leq I_{cs} \leq N-1$, where Ics is an integer).

Hereinafter, an available CS index of the base sequence is defined as a CS index that may be derived from the base sequence according to a CS interval. For one example, if the base sequence has a length of 12 and the CS interval is 1, a total number of available CS indices is 12. For another example, if the base sequence has a length of 12 and the CS interval is 2, a total number of available CS indices is 6. The CS interval may be determined by considering a delay spread.

Figure 8:
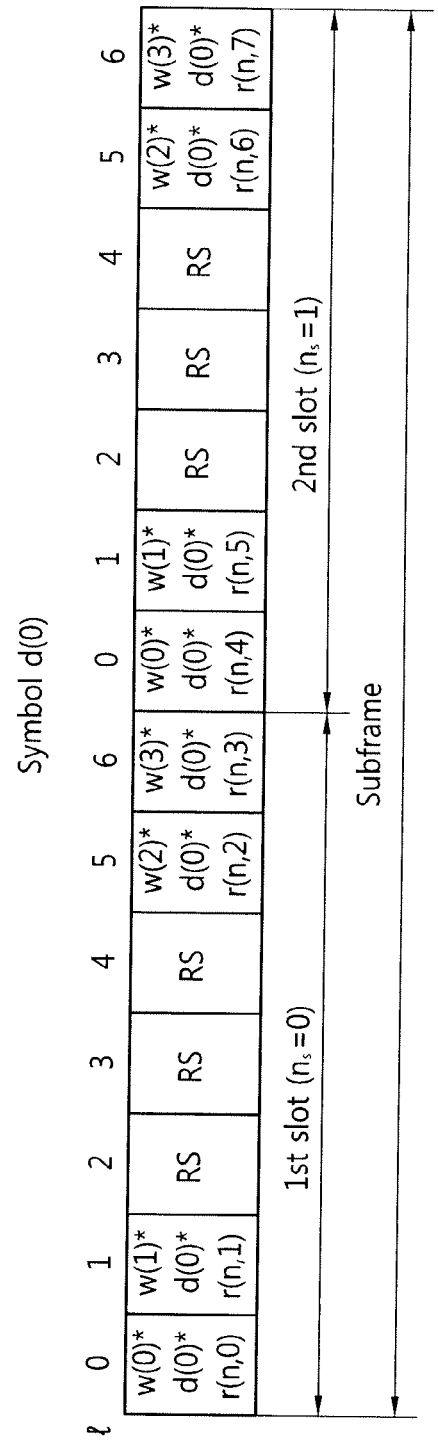
FIG. 8 shows an example of PUCCH format 1/1a/1b transmission when a normal CP is used.

FIG. 8 shows an example of PUCCH format 1/1a/1b transmission when a normal CP is used. Herein, an RB pair allocated to a first slot and a second slot in one subframe is shown. Although it is shown herein that RBs belonging to the RB pair occupy the same frequency band in the first slot and the second slot, the RBs can be hopped in a slot level as described in FIG. 7.

Referring to FIG. 8, each of the first slot and the second slot includes 7 OFDM symbols. Among the 7 OFDM symbols of each slot, a reference signal (RS) is carried on 3 OFDM symbols, and control information is carried on the remaining 4 OFDM symbols. The RS is carried on 3 contiguous OFDM symbols positioned in a middle portion of each slot. In this case, the position and the number of symbols used for the RS may vary, and thus the position and the number of symbols used for the control information may also vary.

Each of the PUCCH formats 1, 1a, and 1b uses one complex-valued symbol d(0). A BS can detect an SR according to presence/absence of PUCCH format 1 transmission from a UE. That is, on-off keying (OOK) modulation scheme may be used in SR transmission. Therefore, any complex number can be used as the complex-valued symbol d(0) for the PUCCH format 1. For example, d(0)=1 can be used. The complex-valued symbol d(0) for the PUCCH format 1a is a modulation symbol generated when 1-bit HARQ ACK/NACK information is modulated using binary phase shift keying (BPSK). The complex-valued symbol d(0) for the PUCCH format 1b is a modulation symbol generated when 2-bit HARQ ACK/NACK information is modulated using quadrature phase shift keying (QPSK). The PUCCH format 1a is for HARQ ACK/NACK information on one codeword. The PUCCH format 1b is for HARQ ACK/NACK information on two codewords.

Table 3 below shows an example of a modulation symbol to which an HARQ ACK/NACK information bit is mapped according to a modulation scheme.

TABLE 3

| Modulation scheme | Information bit(s) | d(0) |
|---|---|---|
| BPSK | 0 | 1 |
|  | 1 | -1 |
| QPSK | 00 | 1 |
|  | 01 | -j |
|  | 10 | j |
|  | 11 | -1 |

A modulated sequence s(n) is generated by using the complex-valued symbol d(0) for the PUCCH formats 1/1a/1b and the cyclically shifted sequence r(n,Ics). The modulated sequence s(n) may be generated by multiplying the complex-valued symbol d(0) by the cyclically shifted sequence r(n,Ics) according to Equation 3 below.

$$s(n)=d(0)r(n,I_{cs})$$ [Equation 3]

A CS index Ics of the cyclically shifted sequence r(n,Ics) may be hopped in a symbol level, starting from an allocated resource. Hereinafter, hopping of the CS index in the symbol level is referred to as CS hopping. The CS hopping can be performed according to a slot number $n_s$ within a radio frame and a symbol index l within a slot. Therefore, the CS index Ics can be expressed by Ics($n_s$,l). The CS hopping can be performed in a cell-specific manner in order to randomize inter-cell interference. Herein, a slot number of the first slot is set to 0, a slot number of the second slot is set to 1, and the CS index is set to Ics(0,0)=0, Ics(0,1)=1, Ics(0,5)=2, Ics(0,6)=3, Ics(1,0)=4, Ics(1,1)=5, Ics(1,5)=6, and Ics(1,6)=7. However, this is for exemplary purposes only.

To increase UE multiplexing capacity, the modulated sequence s(n) may be spread by using an orthogonal sequence. The UE multiplexing capacity denotes the number of UEs that can be multiplexed to the same RB.

Herein, it is shown that the modulated sequence s(n) is spread by using an orthogonal sequence w(k) having a spreading factor K=4 with respect to 4 OFDM symbols for carrying control information within one slot. An orthogonal sequence $w_{Ios}(k)$ having a spreading factor K=4 (where Ios is an orthogonal sequence (OS) index, k is an element index of an orthogonal sequence, $0 \leq k \leq K-1$) may use a sequence as shown in Table 4 below.

TABLE 4

| Orthogonal sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

Elements constituting the orthogonal sequence sequentially correspond in a one-to-one manner to OFDM symbols for carrying control information. Each element of the orthogonal sequence is multiplied by the modulated sequence s(n) carried on its corresponding OFDM symbol to generate a spread sequence. The spread sequence is mapped to an RB pair allocated to a PUCCH in a subframe. After the spread sequence is mapped to the RB pair, IFFT is performed on each OFDM symbol of the subframe to output a time-domain signal for the control information. Although the orthogonal sequence is multiplied before the IFFT is performed, the same result can also be obtained when the orthogonal sequence is multiplied after performing the IFFT on the modulated sequence s(n).

Alternatively, the orthogonal sequence $w_{Ios}(k)$ having a spreading factor K=3 (where Ios is an OS index, k is an element index of an orthogonal sequence, $0 \leq k \leq K-1$) may use a sequence as shown in Table 5 below.

TABLE 5

| Orthogonal sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When a sounding reference signal (SRS) and the PUCCH formats 1/1a/1b are concurrently transmitted in one subframe, one OFDM symbol on the PUCCH is punctured. For example, a last OFDM symbol of the subframe may be punctured. In this case, in a first slot of the subframe, the control information is carried on 4 OFDM symbols. In a second slot of the subframe, the control information is carried on 3 OFDM symbols. Therefore, the orthogonal sequence having the spreading factor K=4 is used for the first slot, and the orthogonal sequence having the spreading factor K=3 is used for the second slot.

The OS index may be hopped in a slot level, starting from an allocated resource. Hereinafter, hopping of the OS index in the slot level is referred to as OS remapping. The OS remapping can be performed according to the slot number $n_s$ within the radio frame. Therefore, the OS index Ios can be expressed by Ios($n_s$). The OS remapping may be performed to randomize inter-cell interference.

The modulated sequence s(n) may be subjected to scrambling in addition to spreading using the orthogonal sequence. For example, the modulated sequence s(n) may be multiplied by 1 or j according to a specific parameter.

The RS can be generated based on the orthogonal sequence and the cyclically shifted sequence generated from the same base sequence as the control information. The cyclically shifted sequence may be used as the RS by spreading the cyclically shifted sequence by the use of the orthogonal sequence w(k) having a spreading factor K=3. Therefore, in order for the UE to transmit the control information, in addition to the OS index and the CS index for the control information, the OS index and the CS index for the RS are also required.

Figure 9:
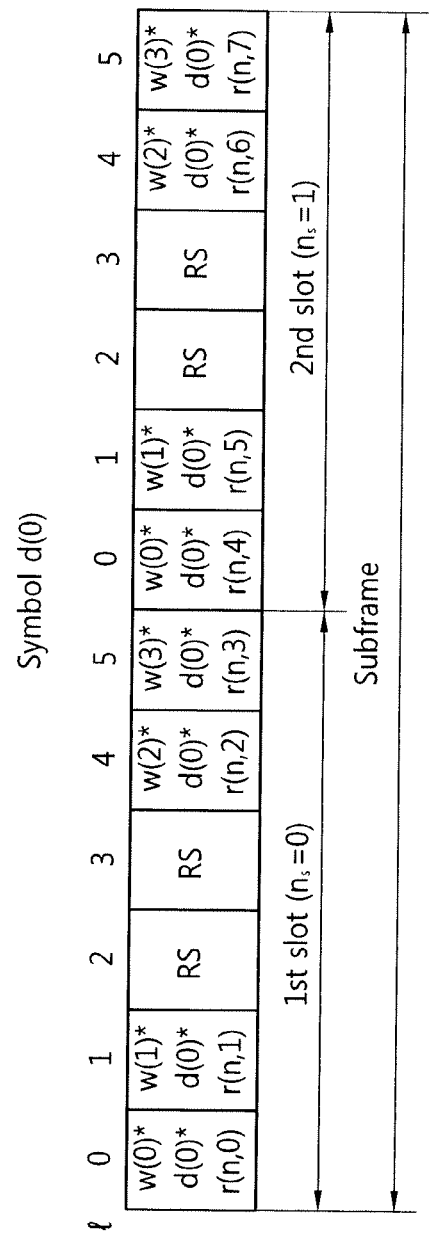
FIG. 9 shows an example of PUCCH format 1/1a/1b transmission when an extended CP is used.

FIG. 9 shows an example of PUCCH format 1/1a/1b transmission when an extended CP is used. Although it is shown herein that RBs belonging to an RB pair occupy the same frequency band in a first slot and a second slot, the RBs may be hopped in a slot level as described in FIG. 7.

Referring to FIG. 9, each of the first slot and the second slot includes 6 OFDM symbols. Among the 6 OFDM symbols of each slot, an RS is carried on 2 OFDM symbols, and control information is carried on the remaining 4 OFDM symbols. Other than that, the example of FIG. 8 in which the normal CP is used can be applied without alteration. However, the RS can be used by spreading the cyclically shifted sequence by the use of an orthogonal sequence w(k) having a spreading factor K=2.

An orthogonal sequence $w_{Ios}(k)$ having a spreading factor K=2 (where Ios is an OS index, k is an element index of an orthogonal sequence, $0 \leq k \leq K-1$) may use a sequence as shown in Table 6 below.

TABLE 6

| Orthogonal sequence index | [w(0), w(1)] |
|---|---|
| 0 | [1 1] |
| 1 | [1 −1] |
| 2 | N/A |

As described above, in both cases of the normal CP and the extended CP, the following information is necessary for PUCCH format 1/1a/1b transmission. That is, a subcarrier (or RB) for transmitting the control information, a CS index Ics and an OS index Ios for the control information, and a CS index I'cs and an OS index I'os for the RS are necessary. For example, when a CS interval is 2 in the extended CP, the UE multiplexing capacity is as follows. Since the number of CS indices Ics and the number of OS indices Ios for the control information are respectively 6 and 3, 18 UEs can be multiplexed per one RB. However, the number of CS indices I'cs and the number of OS indices I'os for the RS are respective 6 and 2, 12 UEs can be multiplexed per one RB. Therefore, the UE multiplexing capacity is limited by an RS part rather than a control information part.

Figure 10:
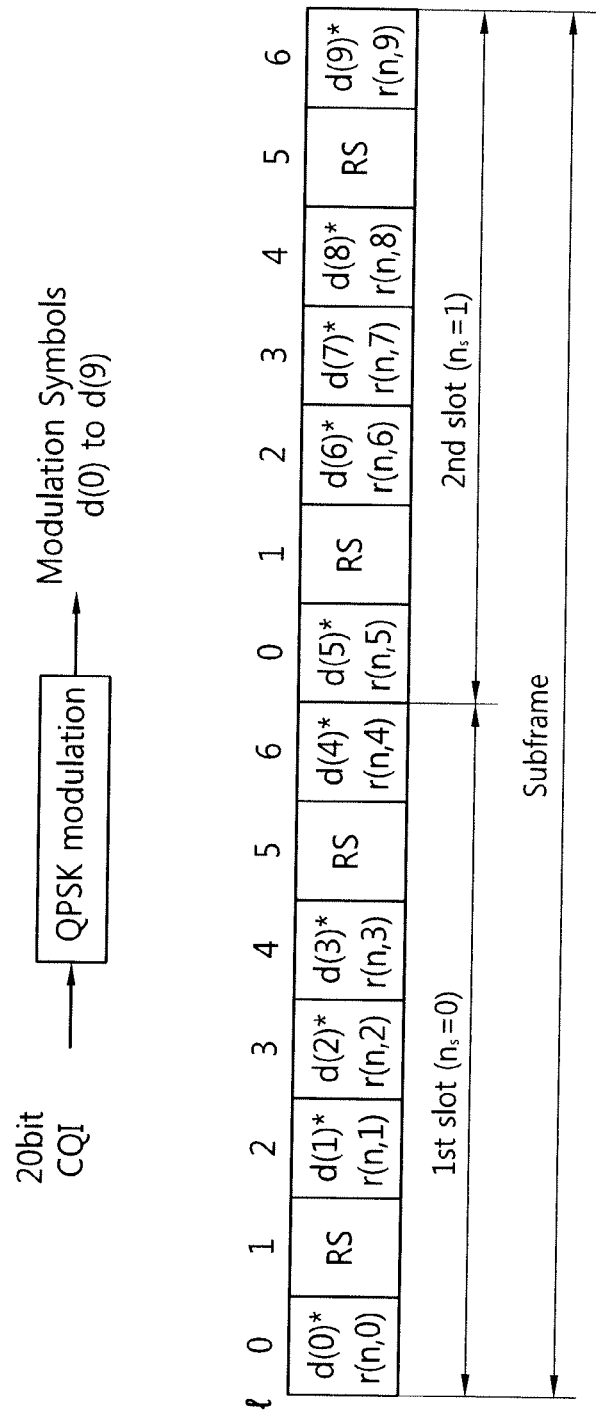
FIG. 10 shows an example of PUCCH format 2/2a/2b transmission when a normal CP is used.

FIG. 10 shows an example of PUCCH format 2/2a/2b transmission when a normal CP is used. Although it is shown herein that RBs belonging to an RB pair occupy the same frequency band in a first slot and a second slot, the RBs may be hopped in a slot level as described in FIG. 7.

Referring to FIG. 10, among 7 OFDM symbols included in each slot, an RS is carried on 2 OFDM symbols and a CQI is carried on the remaining 5 OFDM symbols. In this case, the number and locations of symbols used for the RS may change, and the number and locations of symbols used for the CQI may also change.

A UE generates a coded CQI bit by performing channel coding on a CQI information bit. In this case, a block code may be used. A Reed-Muller code family is one example of the block code. In 3GPP LTE, a (20, A) block code is used, where A is a size of the CQI information bit. That is, in the 3GPP LTE, a 20-bit coded CQI bit is generated always irrespective of the size of the CQI information bit.

Table 7 below shows an example of 13 basis sequences for the (20, A) block code.

TABLE 7

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 1 | 0 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

In Table 7, $M_{i,n}$ denotes a basis sequence (where $0 \leq n \leq 12$, n is an integer). The coded CQI bit is generated by linear combination of the 13 basis sequences. Equation 4 below shows an example of the encoded CQI bit $b_i$ (where $0 \leq i \leq 19$ is an integer).

$$b_i = \sum_{n=0}^{A-1} (a_n \cdot M_{i,n}) \bmod 2 \quad \text{[Equation 4]}$$

In Equation 4, $a_0, a_1, \ldots, a_{A-1}$ denotes the CQI information bit, and A denotes the size of the CQI information bit (where A is a natural number).

The CQI information bit may include one or more fields. Examples of the fields that can be included in the CQI information bit include a CQI field indicating a CQI index for determining an MCS, a precoding matrix indication (PMI) field indicating an index of a precoding matrix selected from a codebook, a rank indication (RI) field indicating a rank, etc.

Table 8 below shows an example of a field included in the CQI information bit and a bit size of the field.

TABLE 8

| Field | Size(bit) |
|---|---|
| Wideband CQI | 4 |

The CQI information bit may include only a 4-bit wideband CQI field. In this case, the size A of the CQI information bit is 4. The wideband CQI field indicates a CQI index for a full band.

Table 9 below shows another example of a field included in the CQI information bit and a bit size of the field.

TABLE 9

| | Size(bit) | | | |
|---|---|---|---|---|
| | 2 antennas | | 4 antennas | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |

TABLE 9-continued

| | Size(bit) | | | |
|---|---|---|---|---|
| | 2 antennas | | 4 antennas | |
| Field | Rank = 1 | Rank = 2 | Rank = 1 | Rank > 1 |
| Precoding matrix indication | 2 | 1 | 4 | 4 |

The CQI information bit may include a wideband CQI field, a spatial differential CQI field, and a PMI field. The spatial differential CQI field indicates a difference between a CQI index for a full band for a first codeword and a CQI index for a full band for a second codeword. A size of each field may differ depending on a rank and the number of transmit antennas of a BS. For example, if the BS uses 4 transmit antennas and the rank is greater than 1, the CQI information bit includes a 4-bit wideband CQI field, a 3-bit spatial difference CQI field, and a 4-bit PMI field (A=11).

Table 10 below shows another example of a field included in the CQI information bit and a bit size of the field.

TABLE 10

| | Size(bit) | | |
|---|---|---|---|
| | | 4 antennas | |
| Field | 2 antennas | Max 2 layers | Max 4 layers |
| Rank indication | 1 | 1 | 2 |

A 20-bit coded CQI bit may be scrambled by using a UE-specific scrambling sequence to generate a 20-bit scrambled bit. The 20-bit scrambled bit is mapped to 10 modulation symbols d(0), . . . , d(9) by using QPSK modulation. In the PUCCH format 2a, 1-bit HARQ ACK/NACK information is mapped to one modulation symbol d(10) by using BPSK modulation. In the PUCCH format 2b, 2-bit HARQ ACK/NACK information is mapped to one modulation symbol d(10) by using QPSK modulation. That is, in the PUCCH format 2a, the CQI and the 1-bit HARQ ACK/NACK information are concurrently transmitted, and in the PUCCH format 2b, the CQI and the 2-bit HARQ ACK/NACK information are concurrently transmitted. Herein, d(10) is used for RS generation. d(10) corresponds to one OFDM symbol between two OFDM symbols on which an RS is carried in each slot. In other words, according to d(10), phase modulation is performed on the RS carried on one OFDM symbol in each slot. The PUCCH formats 2a/2b can be supported only for the normal CP. As such, in each of the PUCCH formats 2a and 2b, one modulation symbol is used for RS generation.

A modulated sequence is generated based on a cyclically shifted sequence r(n,Ics) generated from the modulation symbols d(0), . . . , d(9) and a base sequence. A CS index Ics of the cyclically shifted sequence r(n,Ics) may vary depending on a slot number n, within a radio frame and a symbol index l within a slot. Therefore, the CS index Ics can be expressed by Ics($n_s$,l). Herein, a slot number of the first slot is set to 0, a slot number of the second slot is set to 1, and the CS index is set to Ics(0,0)=0, Ics(0,2)=1, Ics(0,3)=2, Ics(0,4)=3, Ics(0,6)=4, Ics(1,0)=5, Ics(1,2)=6, Ics(1,3)=7, Ics(1,4)=8, and Ics(1,6)=9. However, this is for exemplary purposes only. An RS may use a cyclically shifted sequence generated from the same base sequence as control information.

Unlike the PUCCH formats 1/1a/1 b, the PUCCH formats 2/2a/2b do not use an orthogonal sequence.

Figure 11:
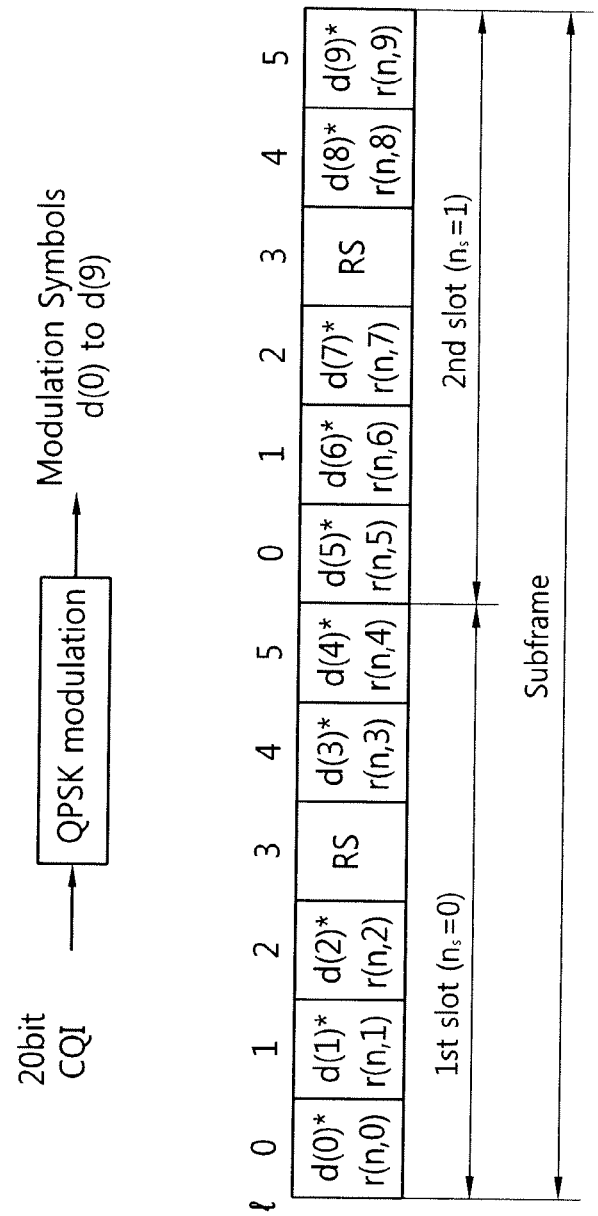
FIG. 11 shows an example of PUCCH format 2/2a/2b transmission when an extended CP is used.

FIG. 11 shows an example of PUCCH format 2/2a/2b transmission when an extended CP is used. Although it is shown herein that RBs belonging to an RB pair occupy the same frequency band in a first slot and a second slot, the RBs may be hopped in a slot level as described in FIG. 7.

Referring to FIG. 11, each of the first slot and the second slot includes 6 OFDM symbols. Among the 6 OFDM symbols of each slot, an RS is carried on one OFDM symbol, and control information is carried on the remaining 5 OFDM symbols. Other than that, the example of FIG. 10 in which the normal CP is used is applied without alteration.

As described above, in both cases of the normal CP and the extended CP, the following information is necessary for PUCCH format 2/2a/2b transmission. A subcarrier (or RB) for transmitting the control information, a CS index Ics for the control information, and a CS index I'cs for the RS are necessary. When a CS interval is 1, the number of indices Ics for the control information and the number of indices I'cs for the RS are 12 each, and thus 12 UEs can be multiplexed per one RB. When the CS interval is 2, the number of indices Ics for the control information and the number of indices I'cs for the RS are 6 each, and thus 6 UEs can be multiplexed per one RB.

Figure 12:
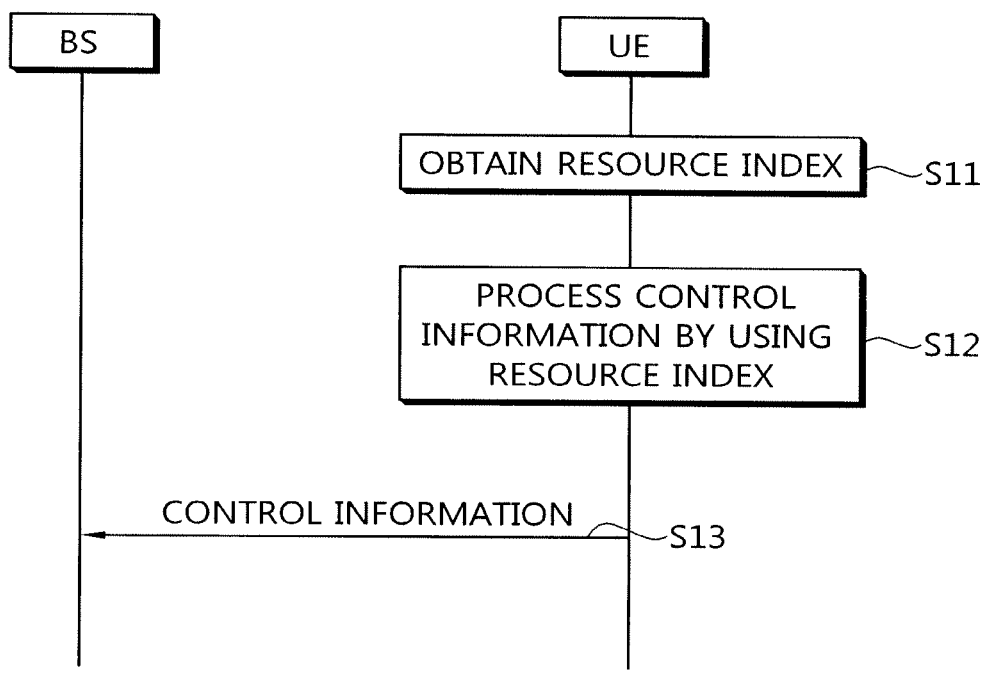
FIG. 12 is a flowchart showing an example of an information transmission method.

FIG. 12 is a flowchart showing an example of an information transmission method.

Referring to FIG. 12, a UE obtains a resource index (step S11). The UE processes information on the basis of the resource index (step S12). The UE transmits the information to a BS (step S13).

A plurality of UEs in a cell can concurrently transmit their information to the BS. In this case, if each UE uses a different resource, the BS can identify information of each UE. The information may be control information, user data, information in which several pieces of control information are mixed, information in which the control information and the user data are multiplexed, etc.

A resource may include at least one of an RB, a frequency-domain sequence, and a time-domain sequence. The RB is a frequency resource for information transmission. The frequency-domain sequence is used to spread a symbol corresponding to the information to a frequency domain. The time-domain sequence is used to spread the symbol to a time domain. When the resource includes the frequency-domain sequence and the time-domain sequence, the frequency-domain sequence and the time-domain sequence are used to spread the symbol to a 2 dimensional time-frequency domain (i.e., the frequency domain and the time domain).

A resource index identifies a resource used for information transmission. According to the resource, the resource index may include at least one of RB information, a frequency-domain sequence index, and a time-domain sequence index. The RB information indicates the RB, the frequency-domain sequence index indicates the frequency-domain sequence, and the time-domain sequence index indicates the time-domain sequence. For example, when the resource includes the RB and the frequency-domain sequence, the resource index may include the RB information and the frequency-domain sequence index.

Hereinafter, a sequence used as the frequency-domain sequence and/or the time-domain sequence will be described in detail. The sequence may be selected from a sequence set having a plurality of sequences as its elements. The plurality of sequences included in the sequence set may be orthogonal to each other, or may have a low correlation with each other.

When the resource includes the sequence, the resource index may include the sequence index. The sequence may be generated based on the sequence index. Hereinafter, the sequence is the frequency-domain sequence and/or the time-domain sequence.

For one example, the sequence index may indicate one sequence selected from the sequence set. Each sequence belonging to the sequence set may one-to-one correspond to one sequence index.

For another example, a sequence index may indicate a CS amount, and a sequence may be generated by cyclically shifting the base sequence by the CS amount.

It is assumed hereinafter that the time-domain sequence is one orthogonal sequence selected from a set of orthogonal sequences, and the frequency-domain sequence is a cyclically shifted sequence generated by cyclically shifting the base sequence by the CS amount. In this case, the time-domain sequence index may be an OS index indicating an orthogonal sequence, and the frequency-domain sequence index may be a CS index indicating a CS amount. However, this is for exemplary purposes only, and is not for restricting the time-domain sequence and/or the frequency-domain sequence.

In case of the PUCCH formats 1/1a/1b, the resource consists of combinations of (1) a CS amount, (2) an orthogonal sequence, and (3) an RB. A resource index indicates a CS index, an OS index, and the RB. For example, if the number of CS indices is 6, the number of OS indices is 3, and the number of RBs is 3, then the total number of resources is 54(=6×3×3). The 54 resources may be numbered with resource indices from 0 to 53. Each of the 54 resources may be allocated to different UEs.

In case of the PUCCH formats 2/2a/2b, the resource consists of combinations of (1) a CS amount and (2) an RB. A resource index indicates a CS index and the RB. For example, the number of CS indices is 6 and the number of RBs is 2, the total number of resources is 12(=6×2). The 12 resources may be numbered with resource indices from 0 to 11. Each of the 12 resources may be allocated to different UEs.

As such, the CS index and the RB are determined from the resource index. In case of the PUCCH formats 1/1a/1b, the OS index is also determined from the resource index. For example, a location index m indicating a logical frequency-domain location of an RB pair allocated to a PUCCH in a subframe may be determined from the resource index.

Figure 13:
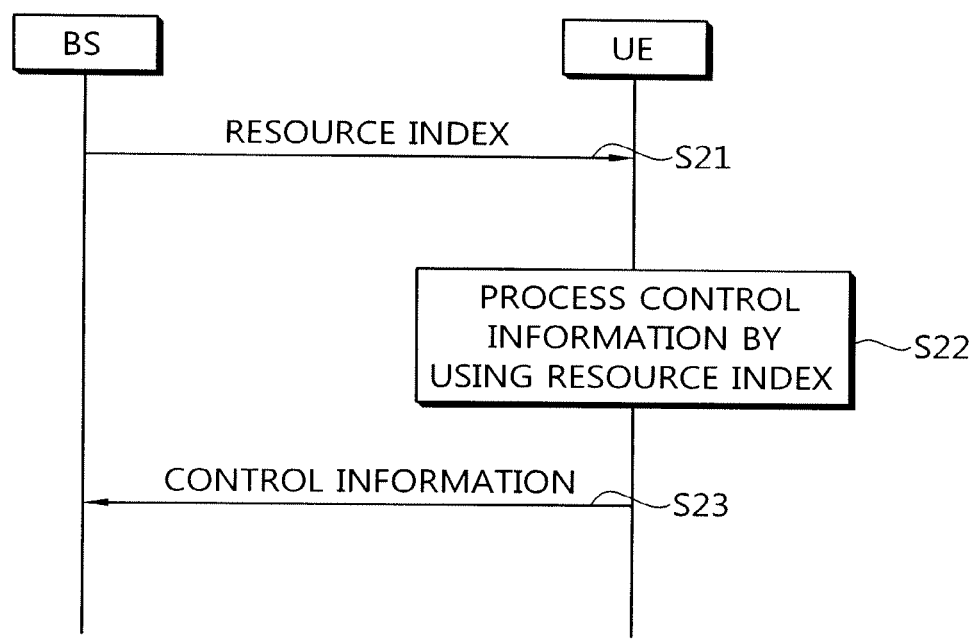
FIG. 13 is a flowchart showing another example of an information transmission method.

FIG. 13 is a flowchart showing another example of an information transmission method.

Referring to FIG. 13, a BS transmits a resource index to a UE (step S21). The UE processes information on the basis of the resource index (step S22). The UE transmits the information to the BS (step S23). As such, the BS may explicitly report the resource index to the UE. The resource index may be configured by higher-layer signaling. For example, a higher layer of a physical layer may be a radio resource control (RRC) layer that controls a radio resource between the UE and a network. In this case, information transmitted by the UE may be an SR, semi-persistent scheduling (SPS), an ACK/NACK, a CQI, etc. The SPS ACK/NACK is an HARQ ACK/NACK for DL data transmitted using the SPS. When the DL data is transmitted through a PDSCH, a PDCCH corresponding to the PDSCH may not exist.

Figure 14:
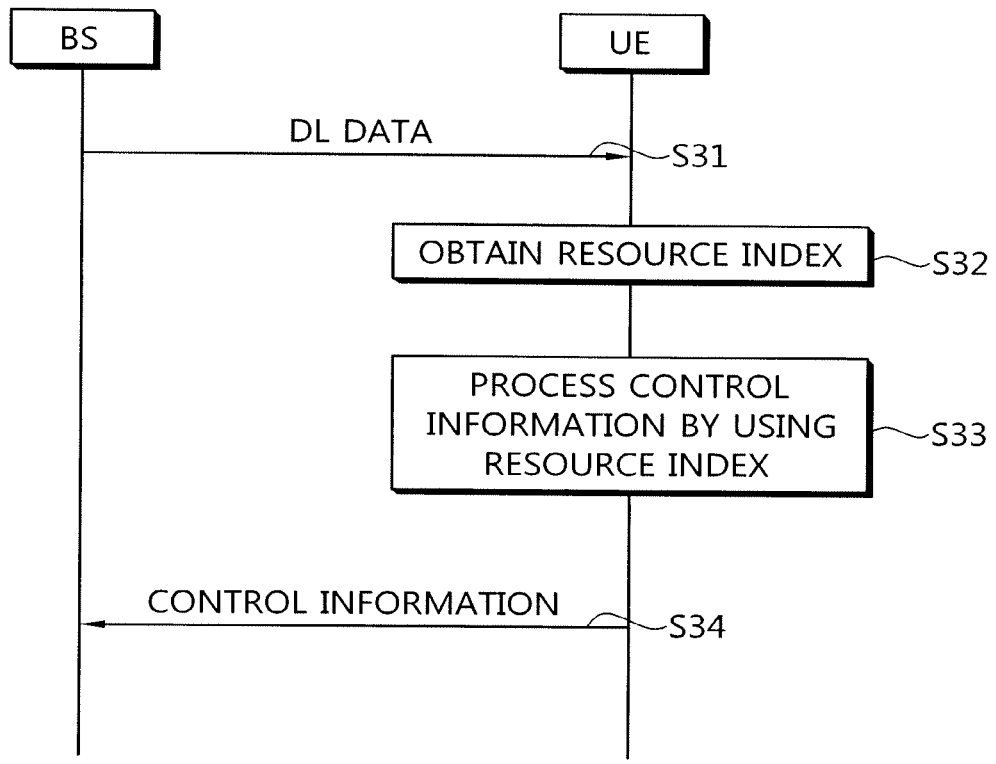
FIG. 14 is a flowchart showing another example of an information transmission method.

FIG. 14 is a flowchart showing another example of an information transmission method.

Referring to FIG. 14, a BS transmits DL data to a UE (step S31). The UE obtains a resource index (step S32). In this case, the resource index may be obtained from a radio resource used to transmit a control channel for receiving DL data. The UE processes information on the basis of the resource index (step S33). The UE transmits the information to the BS (step S34). As such, the BS may implicitly report the resource index to the UE. In this case, information transmitted by the UE may be a dynamic ACK/NACK. The dynamic ACK/NACK is an ACK/NACK for DL data transmitted using dynamic scheduling. In the dynamic scheduling, a DL grant is transmitted to the UE through the PDCCH whenever the BS transmits DL data through the PDSCH.

Equation 5 below shows an example of determining a resource index 'In' for dynamic ACK/NACK transmission.

$$In = n(CCE) + N_{PUCCH}^{(1)} \quad \text{[Equation 5]}$$

In Equation 5, n(CCE) denotes a first CCE index used in PDCCH transmission for a PDSCH, and $N^{(1)}_{PUCCH}$ denotes the number of resource indices allocated for an SR and an SPS ACK/NACK. $N^{(1)}_{PUCCH}$ may be determined by a higher layer such as an RRC layer.

Therefore, the BS can control a resource for ACK/NACK transmission by controlling the first CCE index used in PDCCH transmission.

Figure 15:
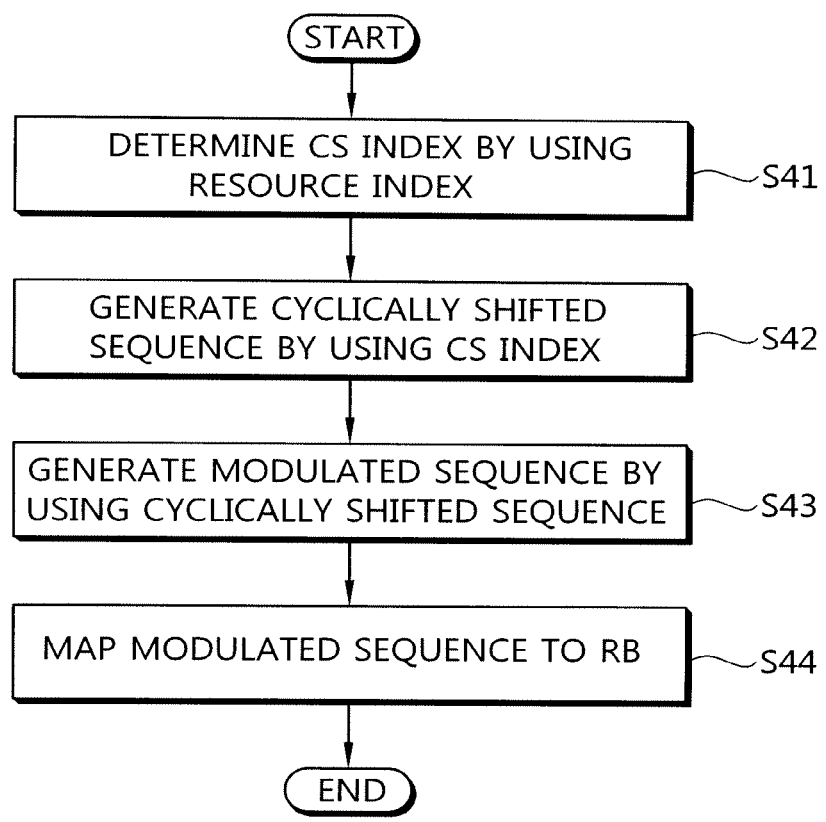
FIG. 15 is a flowchart showing an example of an information processing method based on a resource index.

FIG. 15 is a flowchart showing an example of an information processing method based on a resource index.

Referring to FIG. 15, a UE determines a CS index on the basis of the resource index (step S41). The UE generates a cyclically shifted sequence on the basis of the CS index (step S42). The cyclically shifted sequence may be generated by cyclically shifting a base sequence by a CS amount obtained from the CS index. The UE generates a modulated sequence on the basis of the cyclically shifted sequence and a symbol for information (step S43). The UE maps the modulated sequence to an RB (step S44). The RB may be determined based on the resource index. The UE transmits the modulated sequence. In this case, the information transmitted by the UE may be a CQI.

Figure 16:
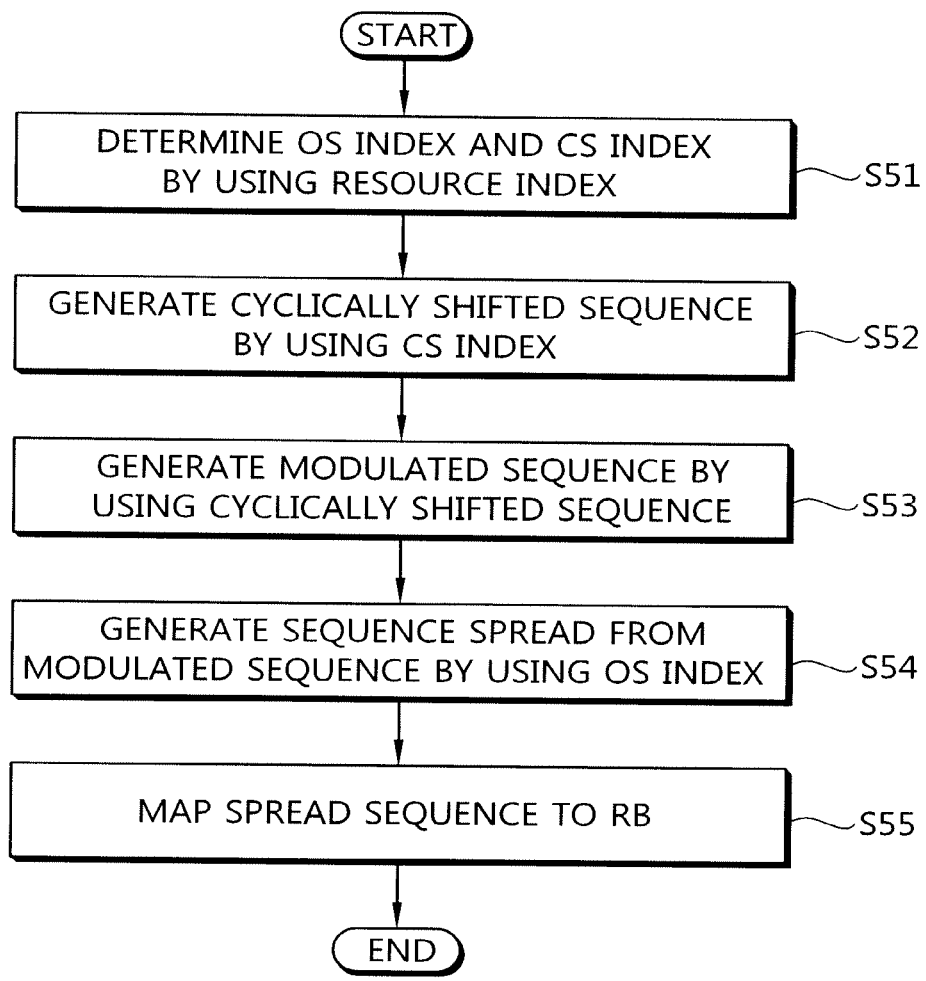
FIG. 16 is a flowchart showing another example of an information processing method based on a resource index.

FIG. 16 is a flowchart showing another example of an information processing method based on a resource index.

Referring to FIG. 16, a UE determines an OS index and a CS index on the basis of the resource index (step S51). The UE generates a cyclically shifted sequence on the basis of the CS index (step S52). The UE generates a modulated sequence on the basis of the cyclically shifted sequence and a symbol for information (step S53). The UE generates a sequence spread from the modulated sequence on the basis of the OS index (step S54). The UE maps the spread sequence to an RB (step S55). The RB may be determined on the basis of the resource index. The UE transmits the spread sequence. In this case, the information transmitted by the UE may be an SR, an HARQ ACK/NACK, etc.

When using the control information transmission method described above, 2-bit HARQ ACK/NACK information for 2 codewords or 20-bit coded CQI bits may be transmitted. Meanwhile, a method capable of transmitting additional control information is necessary while maintaining compatibility with 3GPP LTE. For one example, when the number of codewords increases or when using a multiple-carrier system, the additional control information has to be transmitted. If the number of codewords is 4, there is a need for a method for transmitting 4-bit HARQ ACK/NACK information. For another example, when using a carrier aggregation system having a 2DL-1UL configuration, there is also a need for a method for transmitting the 4-bit HARQ ACK/NACK information.

First, a method of increasing a modulation order for additional control information transmission can be taken into account. For example, if 2-bit control information is modulated using QPSK to generate one modulation symbol, 4-bit control information may be modulated using 16 quadrature amplitude modulation (QAM) to generate one modulation symbol. However, when using 1 QAM, a receiver has to know exact transmit power. In addition, the 16 QAM shows worse performance than the QPSK. The 16 QAM shows different detection performance according to each signal constellation.

Figure 17:
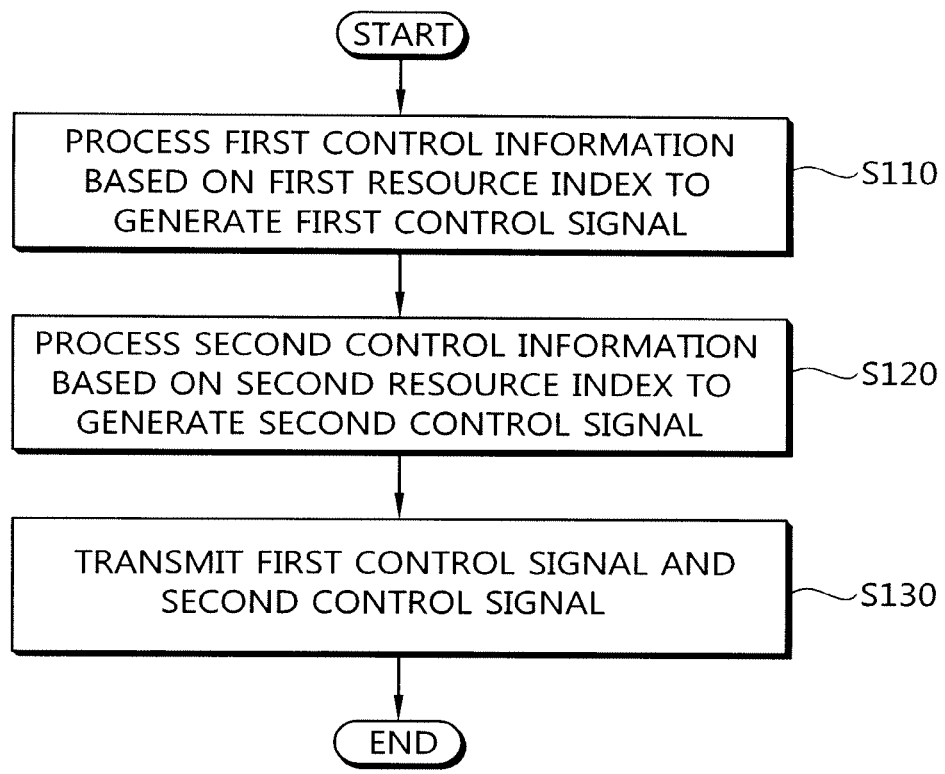
FIG. 17 is a flowchart showing a control signal transmission method according to an embodiment of the present invention.

FIG. 17 is a flowchart showing a control signal transmission method according to an embodiment of the present invention.

Referring to FIG. 17, a UE processes first control information on the basis of a first resource index to generate a first control signal (step S110). The UE processes second control information on the basis of a second resource index to generate a second control signal (step S120). The first resource index and the second resource index may be different from each other. The UE transmits the first control signal and the second control signal to a BS (step S130). The first control signal and the second control signal may be transmitted concurrently. As such, additional control information may be transmitted by allocating an additional resource index.

Herein, the transmitting of the first control signal and the second control signal by the UE to the BS may include generating of a third control signal by phase-shifting the second control signal, generating of a fourth control signal by combining the first control signal and the third control signal, and transmitting of the fourth control signal.

The first control information may be control information for a first DL carrier, and the second control information may be control information for a second DL carrier. The first control information and the second control information can be transmitted on the same UL carrier. The first control information may be a first ACK/NACK for first data received by the UE on the first DL carrier. The second control information may be a second ACK/NACK for second data received by the UE on the second DL carrier. Alternatively, the first control information may be a first CQI for the first DL carrier, and the second control information may be a second CQI for the second DL carrier. That is, a first resource index may be allocated for the first DL carrier, and a second resource index may be allocated for the second DL carrier. In this case, control information for each of the first DL carrier and the second DL carrier may be transmitted on one UL carrier. Therefore, the control signal transmission method of FIG. 17 may be used in an asymmetric multiple carrier system in which the number of DL carriers is greater than the number of UL carriers. For example, the method may be used in a multiple carrier system in which a ratio of the number of DL carriers to the number of UL carriers is 2:1.

Alternatively, each of the first control information and the second control information may be representative control information. The representative control information is one piece of control information that represents a plurality of pieces of control information. When the plurality of pieces of control information are indicated by one piece of representative control information, it is called control information bundling. Examples of the representative control information include a representative CQI, a representative ACK/NACK, a representative PMI, etc. The representative CQI may be one CQI for all of a plurality of DL carriers. For example, the representative CQI may be an average CQI of respective CQIs for the plurality of DL carriers. Alternatively, the representative CQI may be one CQI representing the respective CQIs for a plurality of codewords.

The representative ACK/NACK may be one HARQ ACK/NACK for individual data transmitted on the plurality of DL carriers. For example, when individual data transmitted on the plurality of DL carriers is successfully decoded, the representative ACK/NACK is an ACK, and otherwise, the representative ACK/NACK is an NACK. Alternatively, the representative ACK/NACK may be one HARQ ACK/NACK representing respective ACKs/NACKs for the plurality of codewords.

For one example, the first control information may be first representative control information for the first DL carrier and the second DL carrier, and the second control information may be second representative control information for a third DL carrier and a fourth DL carrier. For another example, the first control information may be first representative control information of a plurality of codewords, and the second control information may be second representative control information for other codewords.

First, each resource index may indicate a CS index and an RB. In this case, a first resource index indicates a first CS index and a first RB, and a second resource index indicates a second CS index and a second RB. Each control information can be processed similarly to the PUCCH formats 2/2a/2b by using each resource index. The UE generates a first cyclically shifted sequence by cyclically shifting a base sequence by a first CS amount obtained from the first CS index, generates a first modulated sequence by using the first cyclically shifted sequence and a first modulation symbol for first control information, and maps the first modulated sequence to the first RB. A first control signal may denote a first time-domain signal which is subjected to IFFT after mapping to the first modulated sequence or the first RB. In addition, the UE generates a second cyclically shifted sequence by cyclically shifting the base sequence by a second CS amount obtained from the second CS index, generates a second modulated sequence by using the second cyclically shifted sequence and a second modulation symbol for second control information, and maps the second modulated sequence to the second RB. A second control signal may denote a second time-domain signal which is subjected to IFFT after mapping to the second modulated sequence or the second RB. In this case, the first control signal and the second control signal may be transmitted concurrently.

The UE may receive the first resource index and the second resource index from the BS. For example, each of a plurality of resource indices may be directly signaled, for example, such that the first resource index is 0 and the second resource index is 2. Alternatively, the UE may receive the first resource index from the BS, and may obtain the second resource index from the first resource index. In this case, the second resource index is predetermined depending on the first resource index. For example, if the first resource index is 0, the second resource index may be predetermined to 5, and if the first resource index is 1, the second resource index may be predetermined to 6. If the BS signals only 0 or 1 as the first resource index, the UE can obtain the second resource index 5 or 6 from the first resource index.

In the first resource index and the second resource index, at least one of a CS index and an RS may differ. Alternatively, to decrease a cubic metric (CM), a scheduler of the BS may restrict a resource index to: (1) a case where the first and second CS indices are different from each other and the first and second RBs are identical to each other; (2) a case where the first and second CS indices are identical to each other and the first and second RBs are different from each other; and (3) one of the cases (1) and (2).

Secondly, each resource index may indicate a CS index, an OS index, and an RB. In this case, the first resource index indicates the first CS index, the first OS index, and the first RB, and the second resource index indicates the second CS index, the second OS index, and the second RB. Each control information can be processed similarly to the PUCCH formats 1/1a/1b by using each resource index. The UE generates the first cyclically shifted sequence by cyclically shifting the base sequence by the first CS amount obtained from the first CS index, generates the first modulated sequence by using the first cyclically shifted sequence and the first modulation symbol for the first control information, generates a first spread sequence from the first modulated sequence by using the first OS index, and maps the first spread sequence to the first RB. The first control signal may denote a first time-domain signal which is subjected to IFFT after mapping to the first spread sequence or the first RB. In addition, the UE generates the second cyclically shifted sequence by cyclically shifting the base sequence by the second CS amount obtained from the second CS index, generates the second modulated sequence by using the second cyclically shifted sequence and the second modulation symbol for the second control information, generates a second spread sequence from the second modulated sequence by using the second OS index, and maps the second spread sequence to the second RB. The second control signal may denote a second time-domain signal which is subjected to IFFT after mapping to the second spread sequence or the second RB. In this case, the first control signal and the second control signal may be transmitted concurrently.

Each control information may be an HARQ ACK/NACK, and an operation of the UE may further include receiving of each DL data from the BS. The first resource index may be obtained from a radio resource for a physical control channel for receiving the first DL data. The second resource index may be obtained from a radio resource for a physical control channel for receiving the second DL data.

In the first resource index and the second resource index, at least one of a CS index, an OS index, and an RB may differ. Alternatively, to decrease the CM, the scheduler of the BS may restrict the resource index to a case where only one of the CS index, the OS index, and the RB differs, for example: (1) a case where the first and second OS indices are equal to each other, the first and second RBs are identical to each other, and the first and second CS indices are different from each other; (2) a case where the first and second CS indices are identical to each other, the first and second RBs are identical to each other, and the first and second OS indices are different from each other; (3) a case where the first and second CS indices are equal to each other, the first and second OS indices are identical to each other, and the first and second RBs are different from each other; (4) one of the cases (1) and (2); (5) one of the cases (1) and (3); (6) one of the cases (2) and (3); and (7) one of the cases (1), (2), and (3).

Although it has been described up to now that each piece of control information is processed similarly to the PUCCH formats 1/1a/1b or the PUCCH formats 2/2a/2b by using each resource index, the present invention can also apply to all CDM-based transmission methods.

The control information transmission method of FIG. 17 can also be extendedly applied to a case of using three or more transmit antennas. When the UE intends to transmit R pieces of control information through R transmit antennas, R different resource indices may be allocated respectively to the R transmit antennas (where R is a natural number greater than or equal to 2). The UE may transmit each piece of control information to the BS through each transmit antenna by using each resource index.

Figure 18:
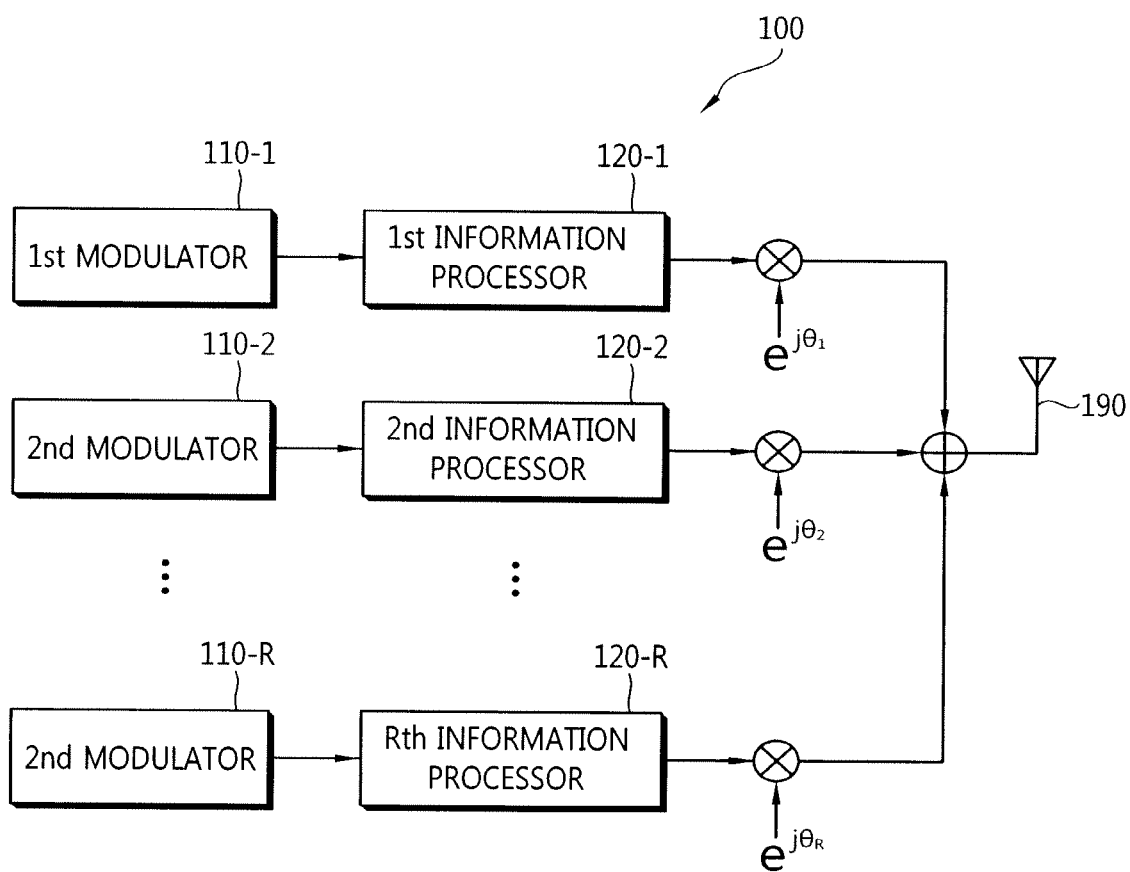
FIG. 18 is a block diagram showing an example of a structure of a transmitter.

FIG. 18 is a block diagram showing an example of a structure of a transmitter. Herein, the transmitter may be a part of a UE or a BS.

Referring to FIG. 18, a transmitter 100 includes R modulators 110, R information processors 120-1, . . . , 120-R (where R is a natural number greater than or equal to 2), and a transmit antenna 190. The $r^{th}$ information processor 120-$r$ is coupled to the $r^{th}$ modulator 120-$r$. A resource index is allocated for each of R pieces of control information. That is, an $r^{th}$ resource index is allocated to $r^{th}$ control information. The $r^{th}$ modulator 110 generates an $r^{th}$ modulation symbol by modulating the $r^{th}$ control information. The $r^{th}$ modulation symbol may be one symbol or a plurality of symbols. The $r^{th}$ modulation symbol is input to the $r^{th}$ information processor 120-$r$. The $r^{th}$ information processor 120-$r$ processes the $r^{th}$ modulation symbol by using the $r^{th}$ resource index to generate an $r^{th}$ control signal. R control signals are combined and then transmitted through one transmit antenna 190. In this case, the $r^{th}$ control signal may be phase-shifted by an $r^{th}$ phase. A case of R=2 will be described for example. A fourth control signal may be transmitted by combining the first control signal and a third control signal phase-shifted by a second phase from the second control signal. In case of BPSK, the second phase may be 90 degrees. In case of QPSK, the second phase may be 45 degrees.

As such, the R pieces of control information may be transmitted by using R resource indices. Although it is shown herein that the transmitter includes only one transmit antennas, the present invention can also apply to a case where the transmitter includes a plurality of transmit antennas. That is, a plurality of resource indices may be applied to each transmit antenna.

First, a case where one modulation symbol is used for control information transmission, such as in the PUCCH formats 1/1a/1b, will be described. It is assumed that a first modulation symbol for the first control information is denoted by $d_1(0)$, and a second modulation symbol for the second control information is denoted by $d_2(0)$. In general, the $r^{th}$ modulation symbol for the $r^{th}$ control information is denoted by $d_r(0)$ (where r is a natural number).

For one example, a case where 2-bit control information '10' is transmitted by being divided into 1-bit first control information '1' and 1-bit second control information '0' will be described. The first control information '1' may be modulated using BPSK to generate a first modulation symbol '−1', and the second control information '0' may be modulated using BPSK to generate a second modulation symbol '1' (i.e., $d_1(0)=-1$ and $d_2(0)=1$).

For another example, a case where 4-bit control information '0110' is transmitted by being divided into 2-bit first control information '01' and 2-bit second control information '10' will be described. The first control information '01' may be modulated using QPSK to generate a first modulation symbol '−j', and the second control information '10' may be modulated using QPSK to generate a second modulation symbol 'T' (i.e., $d_1(0)=-j$, $d_2(0)=j$).

(1) First Embodiment

The first embodiment is a case where a resource used for control information transmission consists of only an orthogonal sequence. In this case, a resource index indicates only an OS index.

An $r^{th}$ orthogonal sequence having a spreading factor K=N indicated by an $r^{th}$ resource index is denoted by $[w_r(0), w_r(1), \ldots, w_r(N-1)]$ (where N is a natural number and r = 1, . . . , R). An $r^{th}$ spread sequence generated by spreading the $r^{th}$ modulation symbol $d_r(0)$ by using the $r^{th}$ orthogonal sequence is denoted by $[z_r(0), z_r(1), \ldots, z_r(N-1)]$. The spread sequence can be generated by Equation 6 below.

$$z_r(k)=d_r(0)\cdot w_r(k), k=0,1,2,\ldots,N-1 \quad \text{[Equation 6]}$$

The $r^{th}$ spread sequence may be mapped to a time domain or a frequency domain. When it is mapped to the frequency domain, the $r^{th}$ spread sequence may be mapped to N subcarriers. When it is mapped to the time domain, the $r^{th}$ spread sequence may be mapped to N time samples, N chips, or N OFDM symbols.

R spread sequences generated by using respective R resource indices may be transmitted in the same transmission duration. For example, the respective spread sequences may be transmitted during one subframe. In this case, the respective spread sequences may be transmitted by using the same RB, or may be transmitted by using different RBs.

A received signal is denoted by $y=[y(0), y(1), \ldots, y(N-1)]$. Each received signal can be expressed by Equation 7 below. It is assumed in this case that a channel has a static characteristic during the transmission duration. That is, the channel characteristic does not change during the transmission duration.

$$y(k) = h\sum_{r=1}^{R} z_r(k) + n(k), \quad \text{[Equation 7]}$$
$$k = 0, 1, \ldots, N-1$$

In Equation 7, h denotes a channel during the transmission duration, and n(k) denotes a $k^{th}$ noise element.

Each of R modulation symbols can be estimated by performing de-spreading on each of R resource indices from the received signal. When an $r^{th}$ estimation symbol for the $r^{th}$ modulation symbol $d_r(0)$ is denoted by $d'_r(0)$, it can be expressed by Equation 8 below.

$$d'_r(0) = \sum_{k=0}^{N-1} y(k) \cdot (w_r(k))^* \qquad \text{[Equation 8]}$$

In Equation 8, N denotes a length of an orthogonal sequence, and $w_r(k)$ denotes a $k^{th}$ element of an $r^{th}$ orthogonal sequence.

The orthogonal sequence may be generated by using a Walsh-Hadamard matrix. Equation 9 below shows a 4×4 Walsh-Hadamard matrix.

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{[Equation 9]}$$

Each of four rows of the Walsh-Hadamard matrix constitute an orthogonal sequence. That is, four orthogonal sequences [1, 1, 1, 1], [1, −1, 1, −1], [1, 1, −1, −1], and [1, −1, −1, 1] can be defined. Although three orthogonal sequences may be used except for [1, 1, −1, −1] (see Table 3) in 3GPP LTE, [1, 1, −1, −1] may also be used.

Hereinafter, a case where R=2, a first orthogonal sequence is [1, 1, 1, 1], and a second orthogonal sequence is [1, −1, 1, −1] will be described for example. A first resource index indicates an OS index 0, and a second resource index indicates an OS index 1 (see Table 3).

A first spread sequence is $[d_1(0), d_1(0), d_1(0), d_1(0)]$, and a second spread sequence is $[d_2(0), -d_2(0), d_2(0), -d_2(0)]$. When a received signal is y=[y(0), y(1), y(2), y(3)], each received signal can be expressed by Equation 10 below.

$$y(0)=\{d_1(0)+d_2(0)\}h+n(0)$$

$$y(1)=\{d_1(0)-d_2(0)\}h+n(1)$$

$$y(2)=\{d_1(0)+d_2(0)\}h+n(2)$$

$$y(3)=\{d_1(0)-d_2(0)\}h+n(3) \qquad \text{[Equation 10]}$$

When a first estimation symbol which is de-spread by using the first orthogonal sequence from the received signal is denoted by $d'_1(0)$ and a second estimation symbol which is de-spread by using the second orthogonal sequence from the received signal is denoted by $d'_2(0)$, it can be expressed by Equation 11 below.

$$d'_1(0)=4d_1(0)+n'_1$$

$$d'_2(0)=4d_2(0)+n'_2 \qquad \text{[Equation 11]}$$

(2) Second Embodiment

The second embodiment is a case where a resource used for control information transmission consists of an orthogonal sequence and a CS amount. In this case, the resource index indicates an OS index and a CS index.

An $r^{th}$ spread sequence generated by using an $r^{th}$ resource index can be expressed in a 2D domain, i.e., a time-frequency domain, by Equation 12 below.

$$\begin{bmatrix} z_r(0,0) & z_r(0,1) & z_r(0,2) & z_r(0,3) \\ z_r(1,0) & z_r(1,1) & z_r(1,2) & z_r(1,3) \\ \vdots & \vdots & \vdots & \vdots \\ z_r(11,0) & z_r(11,1) & z_r(11,2) & z_r(11,3) \end{bmatrix} \qquad \text{[Equation 12]}$$

Herein, each row may correspond to a subcarrier, and each column may correspond to an OFDM symbol. Each element of the matrix may be mapped to a resource element of an RB used in control information transmission. Although the matrix consists of 12 rows and 4 columns herein, this is for exemplary purposes only, and thus the number of rows and the number of columns of the matrix are not limited thereto.

Figure 19:
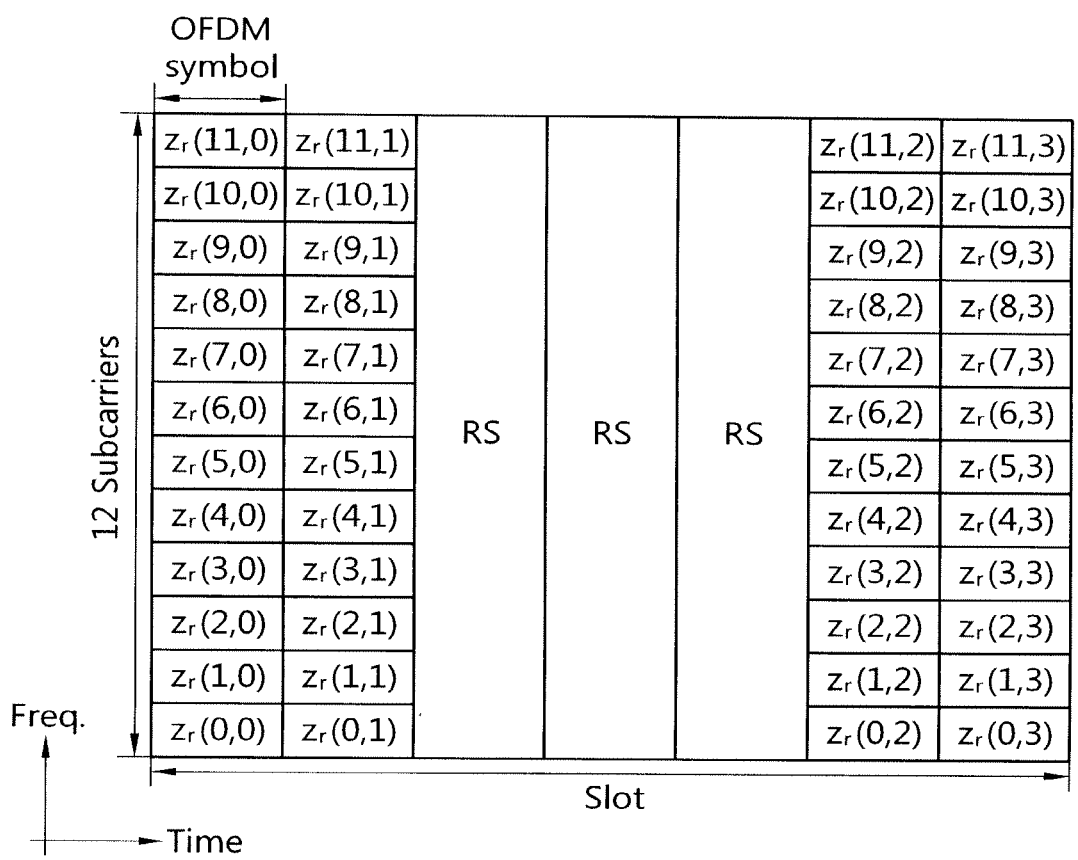
FIG. 19 shows an example of one RB to which an $r^{th}$ spread sequence is mapped.

FIG. 19 shows an example of one RB to which an $r^{th}$ spread sequence is mapped.

Referring to FIG. 19, the RB consists of slots (i.e., 7 OFDM symbols) in a time domain and 12 subcarriers in a frequency domain. Among the 7 OFDM symbols, an RS is carried on 3 OFDM symbols and control information is carried on the remaining 4 OFDM symbols (see FIG. 8).

A UE determines an $r^{th}$ OS index and an $r^{th}$ CS index by using an $r^{th}$ resource index. The UE generates an $r^{th}$ cyclically shifted sequence by using the $r^{th}$ CS index. The UE generates an $r^{th}$ modulated sequence by using the $r^{th}$ cyclically shifted sequence and an $r^{th}$ modulation symbol $d_r(0)$ for $r^{th}$ control information. The UE generates an $r^{th}$ spread sequence from the $r^{th}$ modulated sequence by using the $r^{th}$ OS index. An element of the $r^{th}$ spread sequence can be expressed by Equation 13 below.

$$z_r(n,k)=w_r(k) \cdot d_r(0) \cdot r(n,Ics^r) \qquad \text{[Equation 13]}$$

In Equation 13, n=0, ..., 11 and k=0, 1, 2, 3. $w_r(k)$ denotes a $k^{th}$ element of an $r^{th}$ orthogonal sequence indicated by an $r^{th}$ resource index, $Ics^r$ denotes an $r^{th}$ CS index, and $r(n, Ics^r)$ denotes an $r^{th}$ cyclically shifted sequence.

If R=2, a received signal can be expressed by Equation 14 below.

$$y(n,k)=\{z_1(n,k) \pm z_2(n,k)\}h+n(n,k) \qquad \text{[Equation 14]}$$

When a first estimation symbol which is de-spread by using the first orthogonal sequence from the received signal is denoted by $d'_1(0)$ and a second estimation symbol which is de-spread by using the second orthogonal sequence from the received signal is denoted by $d'_2(0)$, it can be expressed by Equation 15 below.

$$d'_1(0)=48d_1(0)+n'_1$$

$$d'_2(0)=48d_2(0)+n'_2 \qquad \text{[Equation 15]}$$

(3) Third Embodiment

The third embodiment is a case where a resource used for control information transmission consists of an orthogonal sequence, a CS amount, and an RB. In this case, the resource index indicates an OS index, a CS index, and the RB.

An $r^{th}$ spread sequence can be expressed by Equation 16 below.

$$z_r(n+R_r,k)=w_r(k) \cdot d_r(0) \cdot r(n,Ics^r) \qquad \text{[Equation 16]}$$

In Equation 16, k denotes a symbol index of an OFDM symbol in an $r^{th}$ RB. Except for OFDM symbols on which an RS is carried, k may be set to k=0, 1, 2, and 3. $R_r$ denotes a frequency location offset of the $r^{th}$ RB, and n denotes a subcarrier index in the $r^{th}$ RB (where n=0, 1, ..., 11). $w_r(k)$ denotes a $k^{th}$ element of an $r^{th}$ OS index, $d_r(0)$ is an $r^{th}$ modulation symbol for $r^{th}$ control information, $Ics^r$ denotes an $r^{th}$ CS index, and $r(n,Ics^r)$ denotes an $r^{th}$ cyclically shifted sequence.

Now, a case where a plurality of modulation symbols are used for control information transmission, such as in the PUCCH formats 2/2a/2b, will be described. A resource used for control information transmission consists of a cyclically shifted sequence and an RB. In this case, a resource index indicates a CS index and the RB.

A UE determines an $r^{th}$ CS index and an $r^{th}$ RB by using an $r^{th}$ resource index. The UE generates an $r^{th}$ cyclically shifted sequence by using the $r^{th}$ CS index. The UE generates an $r^{th}$ modulated sequence by using the $r^{th}$ cyclically shifted sequence and a plurality of $r^{th}$ modulation symbols for $r^{th}$ control information. The UE maps the $r^{th}$ modulated sequence to the $r^{th}$ RB.

An element of the $r^{th}$ spread sequence can be expressed by Equation 17 below.

$$s_r(n + R_r, k) = d_r(k) \cdot r(n) \cdot \exp\left(\frac{j2\pi n Ics^r}{12}\right)$$ [Equation 17]

In Equation 17, k may be a symbol index of an OFDM symbol in an $r^{th}$ RB. Except for OFDM symbols on which an RS is carried, k may be set to k=0, 1, . . . , 9. $R_r$ denotes a frequency location offset of the $r^{th}$ RB, and n denotes a subcarrier index in the $r^{th}$ RB (where n=0, 1, . . . , 11). $r^{th}$ modulation symbol for $r^{th}$ control information, $Ics^r$ denotes an $r^{th}$ CS index, and $r(n,Ics^r)$ denotes an $r^{th}$ cyclically shifted sequence.

Figure 20:
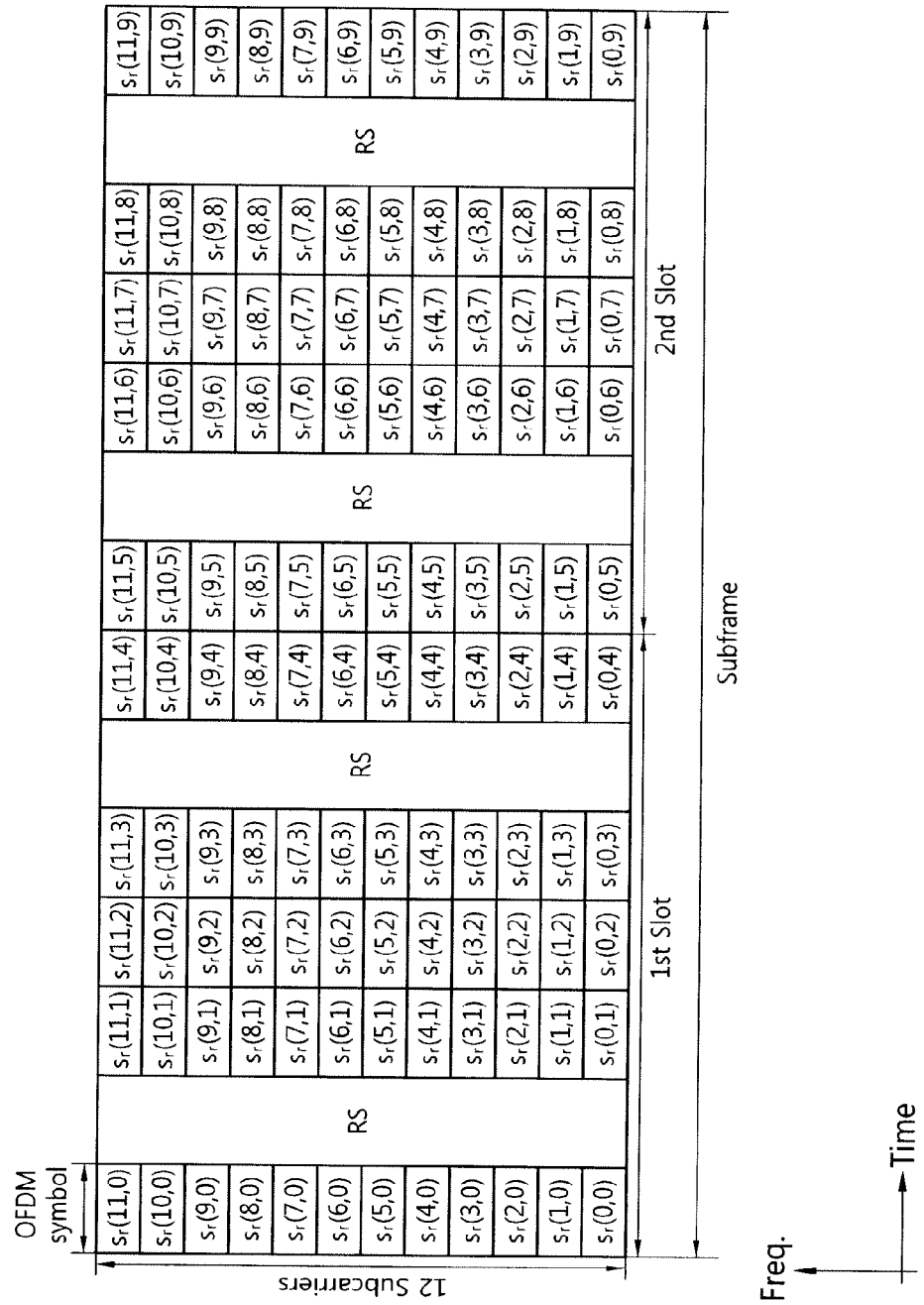
FIG. 20 shows an example of a subframe in which an $r^{th}$ modulated sequence is mapped.

FIG. 20 shows an example of a subframe in which an $r^{th}$ modulated sequence is mapped. Although it is shown herein that RBs belonging to an RB pair occupy the same frequency band in a first slot and a second slot, the RBs can be hopped in a slot level as described in FIG. 7.

Referring to FIG. 20, among 7 OFDM symbols included in each slot, an RS is carried on 2 OFDM symbols, and control information is carried on the remaining 5 OFDM symbols (see FIG. 10).

Figure 21:
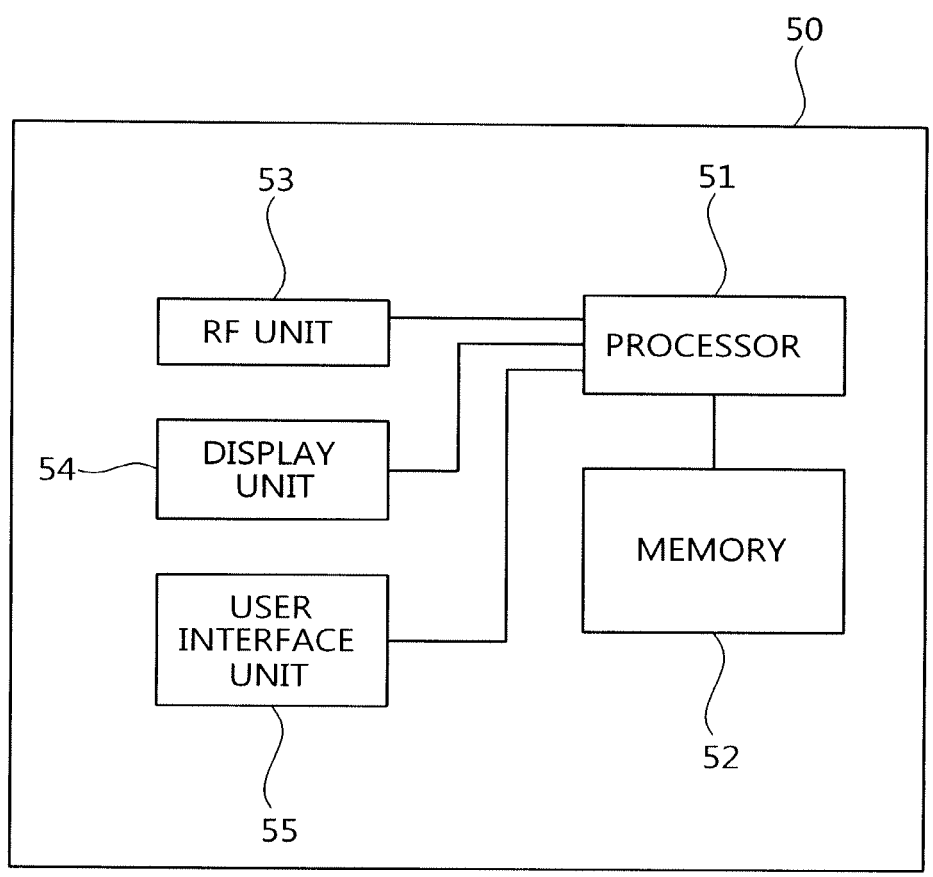
FIG. 21 is a block diagram showing an apparatus for radio communication.

FIG. 21 is a block diagram showing an apparatus for radio communication. An apparatus 50 for radio communication may be a part of a UE. The apparatus 50 includes a processor 51, a memory 52, a radio frequency (RF) unit 53, a display unit 54, and a user interface unit 55. The RF unit 53 is coupled to the processor 51 and transmits and/or receives radio signals. The memory 52 is coupled to the processor 51 and stores an operating system, an application, and a general file. The display unit 54 displays a variety of information of a UE and may use a well-known element such as a liquid crystal display (LCD), an organic light emitting diode (OLED), etc. The user interface unit 55 can be configured with a combination of well-known user interfaces such as a keypad, a touch screen, etc. The processor 51 performs all methods related to the aforementioned information processing and transmission.

Figure 22:
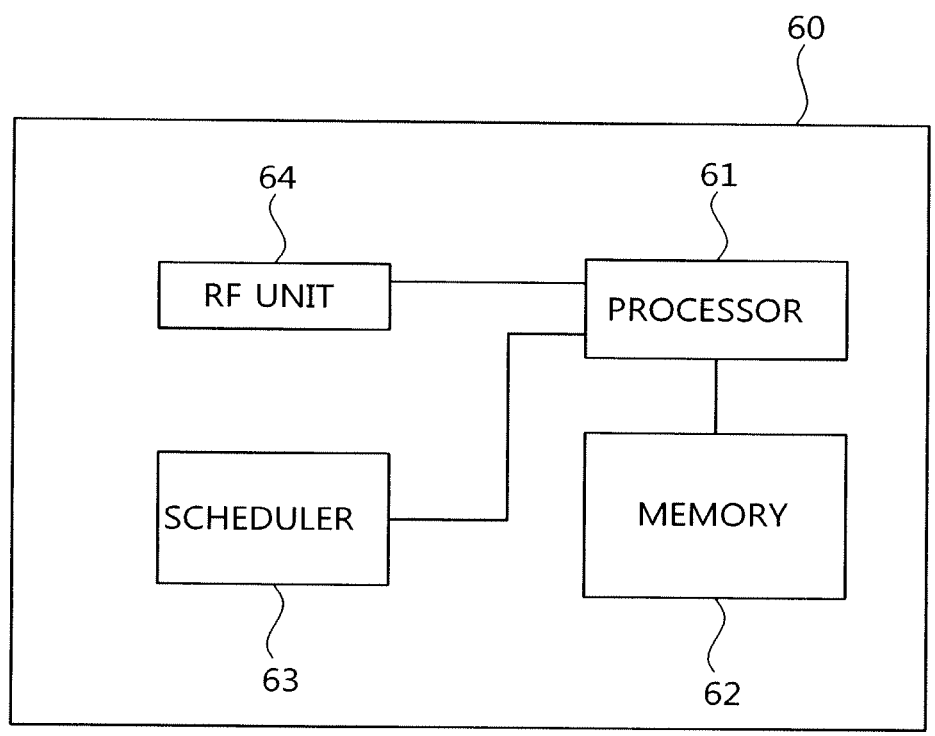
FIG. 22 is a block diagram showing an example of a BS.

FIG. 22 is a block diagram showing an example of a BS. A BS 60 includes a processor 61, a memory 62, a scheduler 63, and an RF unit 64. The RF unit 64 is coupled to the processor 61 and transmits and/or receives radio signals. The processor 61 performs all methods related to the aforementioned information processing and transmission. The memory 62 is coupled to the processor 61, and stores information processed in the processor 61. The scheduler 63 is coupled to the processor 61, and can perform all methods related to scheduling for information transmission such as the aforementioned resource index allocation.

As such, a method and apparatus for effectively transmitting a control signal in a radio communication system can be provided. There is also provided a method of effectively transmitting additional control information in a multiple carrier system while maintaining compatibility with a single-carrier system. In particular, the control information can be effectively transmitted in an asymmetric multiple carrier system in which the number of DL carriers is different from the number of UL carriers. In addition, the additional control information can be effectively transmitted in a system supporting two or more codewords while satisfying backward compatibility with 3GPP LTE supporting up to 2 codewords. Accordingly, reliability of radio communication can be increased, and overall system performance can be improved.

Although the above descriptions have focused on UL information transmission, the same can also apply to DL information transmission without change. In addition, the aforementioned description can apply not only to control information transmission but also to general information transmission such as data information transmission or the like.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for transmitting, by a user equipment, an uplink control signal in a wireless communication system, wherein the wireless communication system uses a time division duplex (TDD) scheme, the method comprising:

receiving a first set of codewords through a first physical downlink shared channel (PDSCH), indicated by a first physical downlink control channel (PDCCH), on a first downlink (DL) carrier in carrier aggregation;

receiving a second set of codewords through a second PDSCH, indicated by a second PDCCH, on a second DL carrier in carrier aggregation;

obtaining a first resource based on the first PDCCH;

obtaining a second resource based on the second PDCCH; and transmitting an uplink control signal on a single uplink (UL) carrier using at least one of the first resource and the second resource, wherein the uplink control signal is based on first acknowledgement (ACK)/non-acknowledgement (NACK) information for the first set of codewords and second ACK/NACK information for the second set of codewords.

2. The method of claim 1, wherein the first resource, and the second resource are different from each other.

3. The method of claim 1, wherein the first resource is obtained based on a number of first control channel elements (CCE) used for the first PDCCH.

4. The method of claim 1, wherein the uplink control signal includes a quadrature phase shift keying (QPSK)-modulated symbol.

5. The method of claim 1, wherein the uplink control signal is 1-bit.

6. The method of claim 1, wherein the first ACK/NACK information is first representative ACK/NACK information of ACK/NACK information for the first set of codewords.

7. The method of claim 1, wherein the second ACK/NACK information is second representative ACK/NACK information of ACK/NACK information for the second set of codewords.

8. The method of claim 1, wherein the first set of codewords is received via a first plurality of subframes.

9. The method of claim 1, wherein the second set of codewords is received via a second plurality of subframes.

10. A user equipment in a wireless communication system, wherein the wireless communication system uses a time division duplex (TDD) scheme, the user equipment comprising:
a radio frequency (RF) unit for transmitting or receiving a radio signal; and
a processor coupled to the RF unit, and configured to:
receive a first set of codewords through a first physical downlink shared channel (PDSCH), indicated by a first physical downlink control channel (PDCCH), on a first downlink (DL) carrier in carrier aggregation;
receive a second set of codewords through a second PDSCH, indicated by a second PDCCH, on a second DL carrier in carrier aggregation;
obtain a first resource based on the first PDCCH;
obtain a second resource based on the second PDCCH; and
transmit an uplink control signal on a single uplink (UL) carrier using at least one of the first resource and the second resource,
wherein the uplink control signal is based on first acknowledgement (ACK)/non-acknowledgement (NACK) information for the first set of codewords and second ACK/NACK information for the second set of codewords.

11. The user equipment of claim 10, wherein the first resource and the second resource are different from each other.

12. The user equipment of claim 10, wherein the first resource is obtained based on a number of first control channel elements (CCE) used for the first PDCCH.

13. The user equipment of claim 10, wherein the uplink control signal includes a quadrature phase shift keying (QPSK)-modulated symbol.

14. The user equipment of claim 10, wherein the uplink control signal is 1-bit.

15. The user equipment of claim 10, wherein the first ACK/NACK information is first representative ACK/NACK information of ACK/NACK information for the first set of codewords.

16. The user equipment of claim 10, wherein the second ACK/NACK information is second representative ACK/NACK information of ACK/NACK information for the second set of codewords.

17. The user equipment of claim 10, wherein the first set of codewords is received via a first plurality of subframes.

18. The user equipment of claim 10, wherein the second set of codewords is received via a second plurality of subframes.

* * * * *